(12) United States Patent
Konowalczyk

(10) Patent No.: US 12,281,817 B2
(45) Date of Patent: Apr. 22, 2025

(54) METHODS AND SYSTEMS AND APPARATUS TO SUPPORT REDUCED ENERGY AND WATER USAGE

(71) Applicant: OCTOPUS ENERGY HEATING LIMITED, London (GB)

(72) Inventor: Peter Konowalczyk, London (GB)

(73) Assignee: OCTOPUS ENERGY HEATING LIMITED, London (GB)

( * ) Notice: Subject to any disclaimer, the term of this patent is extended or adjusted under 35 U.S.C. 154(b) by 0 days.

(21) Appl. No.: 18/275,842

(22) PCT Filed: Feb. 7, 2022

(86) PCT No.: PCT/IB2022/051064
§ 371 (c)(1),
(2) Date: Aug. 4, 2023

(87) PCT Pub. No.: WO2022/168034
PCT Pub. Date: Aug. 11, 2022

(65) Prior Publication Data
US 2024/0093911 A1    Mar. 21, 2024

(30) Foreign Application Priority Data

Feb. 7, 2021   (GB) ..................................... 2101678
Jul. 2, 2021   (GB) ..................................... 2109593
(Continued)

(51) Int. Cl.
*F24H 15/429*   (2022.01)
*F24D 19/10*    (2006.01)
*F24H 15/156*   (2022.01)

(52) U.S. Cl.
CPC ......... *F24H 15/429* (2022.01); *F24D 19/106* (2013.01); *F24H 15/156* (2022.01);
(Continued)

(58) Field of Classification Search
CPC ........ F24H 15/429; F24H 15/156; F24H 4/04; F24H 7/04; F24H 7/0441; F24H 15/174;
(Continued)

(56) References Cited

U.S. PATENT DOCUMENTS

| 4,798,059 A | 1/1989 | Morita |
| 2006/0173653 A1* | 8/2006 | Chian .................... F24H 15/104 702/182 |

(Continued)

FOREIGN PATENT DOCUMENTS

| AT | 504285 A1 | 4/2008 |
| CN | 201191144 Y | 2/2009 |

(Continued)

OTHER PUBLICATIONS

Search Report; The Intellectual Property Office of the United Kingdom; Application No. GB2111086.1, Date: Sep. 9, 2021.

(Continued)

*Primary Examiner* — Kidest Bahta
(74) *Attorney, Agent, or Firm* — Greenberg Traurig, LLP; Chinh H. Pham; Andrew Cull

(57) ABSTRACT

Provided is a method of signalling a command to a water heating appliance remote from a controllable water outlet fed from the appliance via a water supply installation, the method comprising: monitoring the water supply that feeds the controllable water outlet; detecting a sequence of changes in a property or state of the water supply consequent on operation of the controllable water outlet; correlating the sequence of changes with a stored pattern; detecting a match above a stored threshold; interpreting the match as a command. It is thus possible to manipulate a tap, or other controllable water outlet, to signal to a processor so that the temperature or flow rate of water supplied by the outlet can be increased. Thus a water supply system may have default (Continued)

flow and temperature levels designed for economy and low water usage, but a user can on demand override one or both of these limitations without the necessity of needing to go to the appliance to reset it. The water heating appliance is preferably an instantaneous water heating appliance. Also provided is a water supply installation including a water heating appliance, a controllable water outlet remote from the appliance, a water supply line arranged to feed the controllable water outlet with heated water from the appliance, and at least one sensor to sense a property or state of the water supply line, and a processor coupled to the at least one sensor; the processor being configured to detect a sequence of changes in a property or state of the water supply consequent on operation of the controllable water outlet; correlate the sequence of changes with a stored pattern; detect a match above a stored threshold; interpret the match as a command; and take an action in accordance with the command.

17 Claims, 10 Drawing Sheets

(30) Foreign Application Priority Data

| | | |
|---|---|---|
| Jul. 2, 2021 | (GB) | 2109594 |
| Jul. 2, 2021 | (GB) | 2109596 |
| Jul. 2, 2021 | (GB) | 2109597 |
| Jul. 2, 2021 | (GB) | 2109598 |
| Jul. 2, 2021 | (GB) | 2109599 |
| Jul. 2, 2021 | (GB) | 2109600 |
| Aug. 2, 2021 | (GB) | 2111086 |

(52) U.S. Cl.
CPC ...... *F24D 2200/08* (2013.01); *F24D 2200/12* (2013.01); *F24D 2200/14* (2013.01)

(58) Field of Classification Search
CPC .... F24H 15/225; F24H 15/262; F24H 15/265; F24H 9/2007; F24D 19/106; F24D 2200/08; F24D 2200/12; F24D 2200/14; F24D 17/0089; F24D 17/0021; F24D 20/02; F24D 2200/10; F24D 2220/042; F24D 2220/044; F24D 2220/10; F24D 11/004; F24D 11/0228; F24D 17/0015; F24D 17/0026; F24D 17/02; F24D 19/1054; F24D 19/1057; F24D 19/1072; F24D 19/1075; F24D 11/003; F24D 19/1051; F28D 20/02; F28D 2021/0068; F28D 20/028; F28F 226/26; Y02B 10/20; Y02B 10/70; Y02E 60/14; G05D 23/1905
See application file for complete search history.

(56) References Cited

U.S. PATENT DOCUMENTS

| | | | | |
|---|---|---|---|---|
| 2011/0035063 A1* | 2/2011 | Palayur | ............... | G06Q 50/06 |
| | | | | 700/282 |
| 2011/0271953 A1 | 11/2011 | Wortmann et al. | | |
| 2012/0227953 A1* | 9/2012 | Yun | ............... | F24D 19/1069 |
| | | | | 165/200 |
| 2014/0229022 A1* | 8/2014 | Deivasigamani | ... | F24D 19/1051 |
| | | | | 700/282 |
| 2015/0346740 A1* | 12/2015 | Whitehouse | .......... | F24H 15/242 |
| | | | | 236/12.1 |
| 2018/0038616 A1 | 2/2018 | Scheers et al. | | |
| 2019/0024943 A1* | 1/2019 | Scott | ............... | G01R 33/072 |
| 2019/0195513 A1* | 6/2019 | Colon | ............... | F24D 11/0221 |
| 2020/0348705 A1* | 11/2020 | Deivasigamani | .. | G05B 23/0235 |
| 2020/0386417 A1 | 12/2020 | Choi et al. | | |
| 2021/0318027 A1 | 10/2021 | Boros et al. | | |

FOREIGN PATENT DOCUMENTS

| | | |
|---|---|---|
| CN | 201265954 Y | 7/2009 |
| CN | 203758014 U | 8/2014 |
| CN | 102625896 B | 12/2014 |
| CN | 107062589 A | 8/2017 |
| CN | 107131552 A | 9/2017 |
| CN | 107860132 A | 3/2018 |
| CN | 111189348 A | 5/2020 |
| CN | 111197863 A | 5/2020 |
| CN | 111380258 A | 7/2020 |
| CN | 111750528 A | 10/2020 |
| CN | 111811142 A | 10/2020 |
| DE | 29921889 U1 | 6/2000 |
| DE | 10006564 A1 | 8/2000 |
| DE | 10151253 C1 | 11/2002 |
| DE | 102008043030 A1 | 4/2010 |
| DE | 102014225693 A1 | 12/2014 |
| EP | 0007538 A1 | 2/1980 |
| EP | 1684035 A1 | 7/2006 |
| EP | 3196559 A1 | 7/2017 |
| EP | 3521727 A1 | 8/2019 |
| EP | 3663670 A1 | 6/2020 |
| GB | 2613709 A | 6/2023 |
| GB | 2604956 B | 10/2023 |
| JP | S5795534 A | 6/1982 |
| JP | S5812992 A | 1/1983 |
| JP | H01256792 A | 10/1989 |
| JP | H1144495 A | 2/1999 |
| JP | 2012002469 A | 1/2012 |
| JP | 2019027740 A | 2/2019 |
| KR | 20100030141 A | 3/2010 |
| KR | 20120103002 A | 9/2012 |
| KR | 101785247 B1 | 10/2017 |
| WO | 2011058383 A2 | 5/2011 |
| WO | 2016189416 A1 | 12/2016 |
| WO | 2018066036 A1 | 4/2018 |
| WO | 2020209979 A2 | 10/2020 |

OTHER PUBLICATIONS

Search Report; The Intellectual Property Office of the United Kingdom; Application No. GB2109593.0; Date: Aug. 20, 2021.
Search Report; The Intellectual Property Office of the United Kingdom; Application No. GB2109594.8; Date: Aug. 12, 2021.
Search Report; The Intellectual Property Office of the United Kingdom; Application No. GB2109596.3; Date: Aug. 10, 2021.
Search Report; The Intellectual Property Office of the United Kingdom; Application No. GB2109597.1; Date: Aug. 10, 2021.
Search Report; The Intellectual Property Office of the United Kingdom; Application No. GB2109598.9; Date: Aug. 10, 2021.
Search Report; The Intellectual Property Office of the United Kingdom; Application No. GB2109599.7; Date: Aug. 10, 2021.
Search Report; The Intellectual Property Office of the United Kingdom; Application No. GB2109600.3; Date: Aug. 20, 2021.
Search Report; The Intellectual Property Office of the United Kingdom; Application No. GB2215387.8; Date: Jan. 16, 2023.
Search Report; The Intellectual Property Office of the United Kingdom; Application No. GB2300970.7; Date: Feb. 20, 2023.
Search Report; The Intellectual Property Office of the United Kingdom; Application No. GB2301308.9; Date: Apr. 3, 2023.
International Search Report; PCT/IB2022/051064; Date: May 31, 2022.

* cited by examiner

METHODS AND SYSTEMS AND APPARATUS TO SUPPORT REDUCED ENERGY AND WATER USAGE

CROSS-REFERENCE TO RELATED APPLICATIONS

This application is the U.S. National Stage application, pursuant to 35 U.S.C. § 371, of PCT International Patent Application No. PCT/IB2022/051064, filed Feb. 7, 2022, designating the International Bureau Patent Office and published in English, which claims priority under 35 U.S.C. §§ 119 and 365 to Great Britain Patent Application No. 2101678.7, filed Feb. 7, 2021, Great Britain Patent Application No. 2109593.0, filed Jul. 2, 2021, Great Britain Patent Application No. 2109594.8, filed Jul. 2, 2021, Great Britain Patent Application No. 2109596.3, filed Jul. 2, 2021, Great Britain Patent Application No. 2109597.1, filed Jul. 2, 2021, Great Britain Patent Application No. 2109598.9, filed Jul. 2, 2021, Great Britain Patent Application No. 2109599.7, filed Jul. 2, 2021, Great Britain Patent Application No. 2109600.3, filed Jul. 2, 2021, Great Britain Patent Application No. 2111086.1, filed Aug. 2, 2021, The contents of each of the aforementioned applications are incorporated herein by reference in their entirety.

TECHNICAL FIELD

The present disclosure variously relates to methods and apparatus, for installations including an in-building hot water supply system, that support reduced energy and water usage.

BACKGROUND—GENERAL

Worldwide, there is a shortage of potable water. Water shortages are now commonly reported around the world, and although it might be thought that such issues only affect "hot" countries and continents, that is no longer the case. The European Environment Agency reports that water shortages or water stress is a problem that affects millions of people around the world, including over 100 million people in Europe. About 88.2% of Europe's freshwater use (drinking and other uses) comes from rivers and groundwater, while the rest comes from Reservoirs (10.3%) and Lakes (1.5%), which makes these sources extremely vulnerable to threats posed by over-exploitation, pollution and climate change.

Consequently, there is an urgent need reduce domestic water usage. In Europe, on average, 144 litres of freshwater per person per day is supplied for household consumption, but much of this water is "wasted" through carelessness and poor choices of taps, showers, and appliances.

Allied to the need to reduce water consumption is the need to reduce domestic energy consumption, particularly given that (at least in Europe) around 75% of heating and cooling is still generated from fossil fuels while only 22% is generated from renewable energy.

According to Directive 2012/27/EU buildings represent 40% of the final energy consumption and 36% of the $CO_2$ emissions of the European Union. The EU Commission report of 2016 "Mapping and analyses of the current and future (2020-2030) heating/cooling fuel deployment (fossil/renewables)" concluded that in EU households, heating and hot water alone account for 79% of total final energy use (192.5 Mtoe). The EU Commission also report that, "according to 2019 figures from Eurostat, approximately 75% of heating and cooling is still generated from fossil fuels while only 22% is generated from renewable energy". To fulfil the EU's climate and energy goals, the heating and cooling sector must sharply reduce its energy consumption and cut its use of fossil fuels. Heat pumps (with energy drawn from the air, the ground or water) have been identified as potentially significant contributors in addressing this problem.

In many countries, there are policies and pressures to reduce carbon footprint. For example, in the UK in 2020 the UK Government published a whitepaper on a Future Homes Standard, with proposals to reduce carbon emissions from new homes by 75 to 80% compared to existing levels by 2025. In addition, it was announced in early 2019 that there would be a ban on the fitment of gas boilers to new homes from 2025. It is reported that in the UK at the time of filing 78% of the total energy used for the heating of buildings comes from gas, while 12% comes from electricity.

The UK has a large number of small, 2-3 bedroom or less, properties with gas-fired central heating, and most of these properties use what are known as combination boilers, in which the boiler acts as an instantaneous hot water heater, and as a boiler for central heating. Combination boilers are popular because they combine a small form factor, provide a more or less immediate source of "unlimited" hot water (with 20 to 35 kW output), and do not require hot water storage. Such boilers can be purchased from reputable manufactures relatively inexpensively. The small form factor and the ability to do without a hot water storage tank mean that it is generally possible to accommodate such a boiler even in a small flat or house—often wall-mounted in the kitchen, and to install a new boiler with one man day's work. It is therefore possible to get a new combi gas boiler installed inexpensively. With the imminent ban on new gas boilers, alternative heat sources will need to be provided in place of gas combi boilers. In addition, previously fitted combi boilers will eventually need to be replaced with some alternative.

Although heat pumps have been proposed as a potential solution to the need to reduce reliance on fossil fuels and cut $CO_2$ emissions, they are currently unsuited to the problem of replacing gas fired boilers in smaller domestic (and small commercial) premises or a number of technical, commercial and practical reasons. They are typically very large and need a substantial unit on the outside of the property. Thus, they cannot easily be retrofitted into a property with a typical combi boiler. A unit capable of providing equivalent output to a typical gas boiler would currently be expensive and may require significant electrical demand. Not only do the units themselves cost multiples of the equivalent gas fired equivalent, but also their size and complexity mean that installation is technically complex and therefore expensive. A storage tank for hot water is also required, and this is a further factor militating against the use of heat pumps in small domestic dwellings. A further technical problem is that heat pumps tend to require a significant time to start producing heat in response to demand, perhaps 30 seconds for self-checking then some time to heat up—so a delay of 1 minute or more between asking for hot water and its delivery. For this reason, attempted renewable solutions using heat pumps and/or solar are typically applicable to large properties with room for a hot water storage tank (with space demands, heat loss and *legionella* risk).

An important component of domestic energy consumption stems from use of domestic hot water, both in terms of the volume of hot water used, and in terms of energy wastage through overheating of domestic hot water. Hot water wastage is also, of course, a significant contributor to the more general problem of water wastage, which also needs to be addressed if mankind is going to have a sustainable future. Aspects of the present disclosure concern methods and installations that can help to reduce usage of hot water, and in this way contribute to a reduction in the usage of both energy and water.

SUMMARY

According to a first aspect, there is provided a method of signalling a command to a water heating appliance remote from a controllable water outlet fed from the appliance via a water supply installation, the method comprising: monitoring the water supply that feeds the controllable water outlet; detecting a sequence of changes in a property or state of the water supply consequent on operation of the controllable water outlet; correlating the sequence of changes with a stored pattern; detecting a match above a stored threshold; and interpreting the match as a command. The method enables a user of the water supply installation to control the behaviour, and in effect alter the settings of, the water heating appliance merely by manipulating a water outlet such as a tap or shower outlet. The water heating appliance may be an instantaneous water heating appliance.

For example, the user can increase the water supply temperature or maximum flowrate, or both, in installations where these properties are limited for reasons of economy.

According to a second aspect there is provided a method of signalling a command to a water heating appliance remote from a controllable water outlet fed from the appliance via a water supply installation, the water heating appliance incorporating a renewable energy source in the form of a heat pump or a solar heating arrangement, and an energy store containing a phase change material to store energy as latent heat, and a supplementary heating element, the method comprising: monitoring the water supply that feeds the controllable water outlet; detecting a sequence of changes in a property or state of the water supply consequent on operation of the controllable water outlet; correlating the sequence of changes with a stored pattern; detecting a match above a stored threshold; interpreting the match as a command; wherein the water heating appliance is arranged initially to provide heated water in a first mode when an outlet is opened and is arranged to switch to a second mode when a command is received; and wherein the first mode comprises an economy mode preferentially using the renewable energy source and/or energy from the energy store and/or using the supplementary heating source at reduced power and wherein the second mode comprises using the supplementary heating element as required to achieve a predetermined target flow and temperature.

Optionally, the property is pressure sensed at a location within the water supply installation. The opening of a water outlet leads to a reduction in the pressure in the supply pipeline, as does the closure of the outlet. The resulting pressure fluctuations may be sensed a considerable distance from the outlet (depending upon static pressure in the system, the diameter and configuration of the supply pipework). Such pressure fluctuations also tend to propagate quickly, making them very suitable for use as control signals.

Optionally, the sequence comprises a series of fluctuations in pressure between relatively high and relatively low pressures. Optionally, the series of fluctuations in pressure include at least two relatively high-pressure pulses following a period of relatively low pressure. Optionally, the sequence comprises a relatively low pressure, a relatively high pressure and then a relatively low pressure in quick succession, preferably within an interval of less than 5 seconds, preferably less than 2 seconds. Optionally, the sequence comprises a relatively high pressure, a relatively low pressure and then a relatively high pressure in quick succession, preferably within an interval of less than 5 seconds, preferably less than 2 seconds.

Optionally, the property is rate of flow of water in the water supply that feeds the controllable water outlet. Optionally, the sequence comprises a series of fluctuations in flow rate between relatively high and relatively low flow rates. Optionally, the sequence comprises a relatively high flow, a relatively low flow and then a relatively high flow in quick succession, preferably within an interval of less than 5 seconds, preferably less than 2 seconds. Optionally, the series of fluctuations in flow rate include at least two relatively high flow periods following a period of relatively low flow. Optionally, the sequence comprises a rapid increase in flow to maximum above a stored threshold rate of increase.

In the method according to any variant of the first aspect, the command may comprise a command to increase the amount of heat delivered—which may equate to increasing both delivery temperature and volume (flow rate), and/or to increase flow to a predetermined higher flow rate (e.g. to a maximum available flow rate, or to some intermediate higher flow rate), and/or to increase flow delivery temperature.

In the method according to any variant of the first aspect, the water heating appliance may be arranged initially to provide heated water in a first mode when an outlet is opened and to switch to a second mode when a command is received. The water heating appliance may be arranged to revert to the first mode from the second mode after the outlet is closed again, so that when the outlet is subsequently opened the water heating appliance once again provides heated water in the first mode. The water heating appliance may be arranged to revert to the first mode from the second mode only after the outlet has been closed for more than a predetermined period.

In the method according to any variant of the first aspect, the water heating appliance may comprise a renewable source of heat (for example, a heat pump or a solar heating system) and/or an energy storage medium, preferably both and optionally a supplementary heating element, preferably an electrical element. The first mode may comprise an economy mode preferentially using the renewable energy source and/or stored energy and/or using the supplementary heating source at reduced power and the second mode may comprise using the supplementary heating element, optionally up to maximum power as required to achieve a target water flow and target water temperature.

The method according to any variant of the first or second aspect, may include an initial stage of learning the pattern for a command, preferably including using a machine learning module with user feedback to set thresholds and distinguish false positives.

According to a third aspect there is provided an apparatus for performing the method according to any variant of the first aspect, the apparatus preferably including a pressure and/or flow transducer, an interface capable of digitising signals from the flow transducer at a sample speed of at least 10 Hz and a processor arranged to process the signals and match changes to stored changes to detect a command. Such an approach goes against conventional wisdom which tends to "debounce" signals and supply a processor with smoothed or averaged values and samples only infrequently.

According to a fourth aspect there is provided an water supply installation including a water heating appliance, a controllable water outlet remote from the appliance, a water supply line arranged to feed the controllable water outlet with heated water from the appliance, and at least one sensor to sense a property or state of the water supply line, and a processor coupled to the at least one sensor; the processor being configured to use the at least one sensor to monitor the water supply line that feeds the controllable water outlet; and to detect a sequence of changes in a property or state of the water supply consequent on operation of the controllable water outlet; correlate the sequence of changes with a stored pattern; detect a match above a stored threshold; interpret the match as a command; and take an action in accordance with the command. The water heating appliance may be an instantaneous water heating appliance.

According to a fifth aspect there is provided a water supply installation including a water heating appliance, the water heating appliance incorporating a renewable energy source in the form of a heat pump or a solar heating arrangement, and an energy store containing a phase change material that stores energy as latent heat, medium, and a supplementary heating element, the renewable energy source being arranged to supply energy to the energy storage arrangement, a controllable water outlet remote from the appliance, a water supply line arranged to feed the controllable water outlet with heated water from the appliance, and at least one sensor to sense a property or state of the water supply line, and a processor coupled to the at least one sensor; the processor being configured to use the at least one sensor to monitor the water supply line that feeds the controllable water outlet; and to detect a sequence of changes in a property or state of the water supply consequent on operation of the controllable water outlet; correlate the sequence of changes with a stored pattern; detect a match above a stored threshold; interpret the match as a command; and take an action in accordance with the command; wherein the water heating appliance is arranged initially to provide heated water in a first mode when an outlet is opened and is arranged to switch to a second mode when a command is received; and wherein the first mode comprises an economy mode preferentially using the renewable energy source and/or stored energy and/or using the supplementary heating source at reduced power and wherein the second mode comprises using the supplementary heating element as required to achieve a predetermined target flow and temperature.

Optionally, the one or more sensors includes a pressure sensor to sense pressure in the water supply line, preferably located between the appliance and the controllable water outlet.

Optionally, the one or more sensors includes a flow sensor to measure flow in the water supply line, preferably located between the appliance and the controllable water outlet, and optionally local to the water outlet.

Optionally, wherein the heating appliance includes a valve to mix heated water with a supply of cold water, the valve being controlled by the processor.

Optionally, the heating appliance includes an energy storage arrangement including a phase change material, and the energy storage arrangement is configured to store energy using latent heat of the phase change material.

Optionally, the heating appliance includes a renewable heat source, preferably a heat pump, coupled to the processor. Optionally, the renewable heat source is arranged to supply energy to the energy storage arrangement.

Optionally, the heating appliance includes a water heater under the control of the processor, the water heater being arranged to receive energy from a networked energy supply.

BRIEF DESCRIPTION OF THE DRAWINGS

Embodiments of various aspects of the disclosure will now be described by way of example only, with reference to the accompanying drawings, in which.

DETAILED DESCRIPTION

Figure 1:
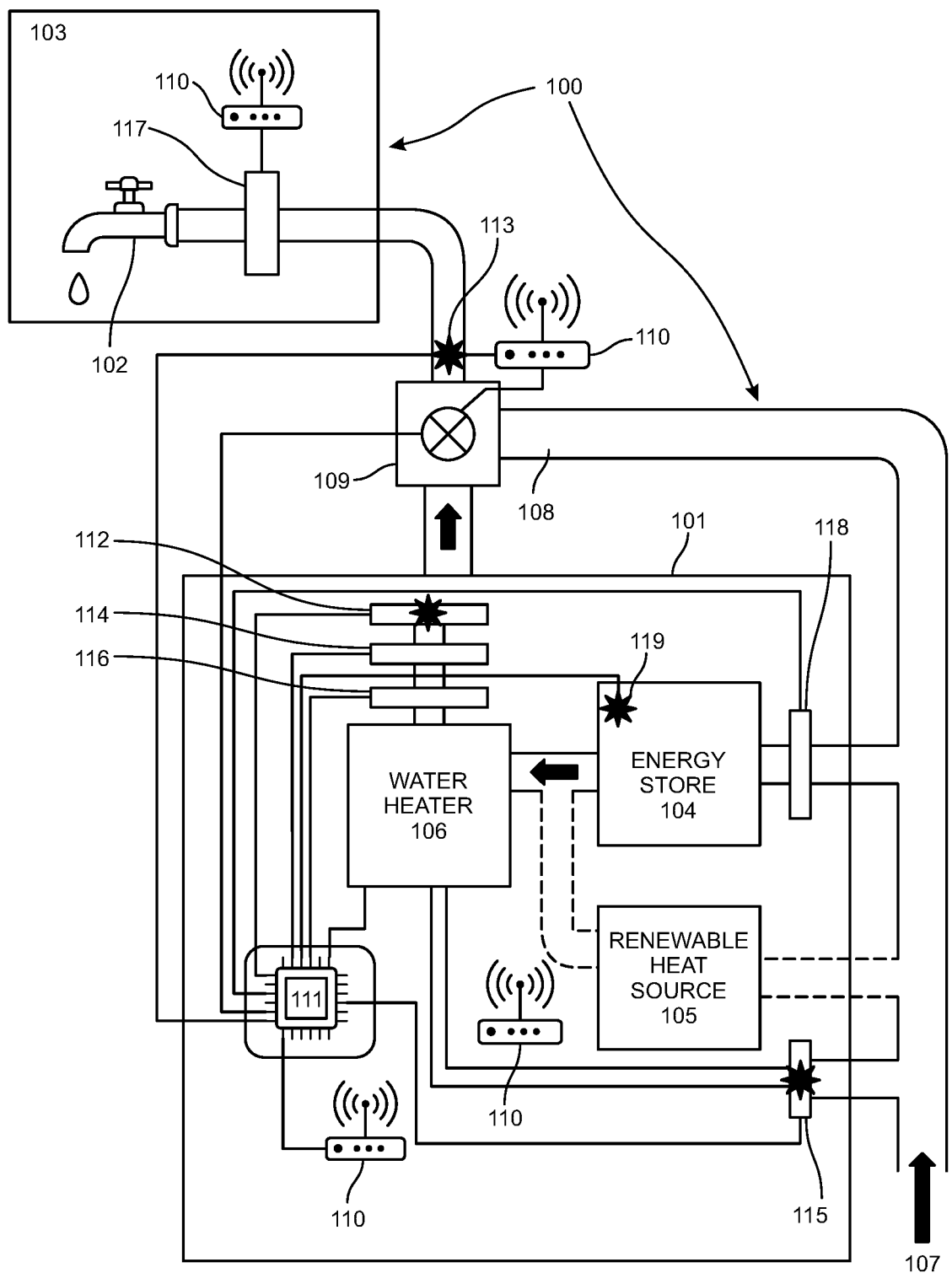
FIG. 1 is a schematic diagram showing a potential arrangement of an installation including an in-building hot water supply system according to an aspect of the disclosure.

FIG. 1 illustrates schematically an installation 100 according to a first aspect of the disclosure. The installation 100 includes a water heating appliance 101, and at least one controllable water outlet 102 remote from the appliance 101, for example in a room 103 other than the one in which the water heating appliance 101 is located. The water heating appliance 101 may be an instantaneous water heating appliance.

The water heating appliance 101 includes an energy store 104, which preferably includes a phase change material to store energy as latent heat, and a renewable heat source 105 which may be a heat pump such as an air or ground source heat pump but could alternatively be a solar heating arrangement. The energy store 104 typically includes a heat exchanger coupled to the renewable heat source 105, so that energy from the latter can be transferred to material in the energy store 104. Thus, a heat transfer liquid may be heated by the renewable heat source 105, circulated through a heat exchanger circuit in the energy store 104, and returned to the renewable heat source 105 for reheating. The appliance 101 preferably also includes an instantaneous water heater 106.

A water supply 107, which may be a mains cold water supply, is coupled to the energy store 104 where it passes through another circuit of the heat exchanger to extract energy from the energy storage material. The water supply 107 is also preferably, as shown, coupled to the instantaneous water heater 106 so that hot water can be produced without needing to pass through the energy store 104. Heated water emerging from the energy store passes at 108 to the water heater 106, and then through a thermostatic mixing valve 109 on towards the hot water supply installation exemplified by pipework 110 and controllable outlet 102 (in practice there will typically be multiple controllable water outlets, including bath taps, shower outlets, handbasin taps, and a kitchen tap, but these are omitted here for ease of explanation). The mixing valve 109, which also receives a supply of cold water from supply 107, is coupled to, and electronically controlled by, a controller or processor 111 of the water heating appliance 101. The water heater 106 may, as shown, be an instantaneous water heating appliance.

The Figure also shows in broken lines a water feed from the supply 107 direct to the renewable heat source 105 and from the renewable heat source into the water heater 106, but this arrangement is optional. In general, if the heat source 105 is a heat pump, energy from the heat pump may only be supplied to the energy store 104, and there is no feed of hot water direct from the energy source 105 to the water heater 106. A possible configuration of the renewable heat course 105 and the energy store 104 will be described in more detail later with reference to FIG. 2.

The processor 111 is also coupled to a first temperature sensor 112 in the flow path from the water heater 106 to the mixing valve 109, another 113 at the outlet of the mixing valve 109, and another 115 to sense the temperature of the water from water supply 107. Also coupled to the processor 111 are a flow or pressure sensor 114 and a flow controller (valve) 116, both in the flow path from the water heater 106 to the mixing valve 109. A further flow sensor or pressure sensor 117, coupled to the processor 111, may be provided in the hot water feed to the outlet (e.g. tap) 102, for example close to the outlet 102. Also, a further flow controller (valve) 118 may be provided on the cold-water feed to the energy store, controlled by the processor 111.

Also shown is a sensing arrangement 119 to provide the processor with information on the status of the energy store, in particular information to enable the processor to determine the energy storage status of the energy store. The sensing arrangement 119 may also measure the temperature of the energy storage medium, so that the processor 111 can determine the amount of energy stored as sensible heat. Various suitable sensing arrangements are described later in this application. The connections between the processor 111 and the various sensors and actuators may be wired, for example using a CAM BUS arrangement, or may be wireless using transceivers 110 (for example using allocated frequencies in the ISM radio bands), or both.

The renewable heat source is preferably a heat pump, such as an air source heat pump, and as such will generally be largely or wholly located outside the building in which the hot water supply system is installed. Typically, the heat pump will include a heat exchanger through which a fluid flows between the heat pump and the appliance 101, heat being taken up in the heat pump by the fluid and exchanged with the energy store 104, cooled fluid returning to the heat exchanger in the heat pump to extract more energy.

Although shown as a separate item, the valve 109 which is controlled by the processor to mix cold water with water heated by the appliance 101 may alternatively be integrated with the appliance 101, either internally or externally, to make a largely self-contained appliance (it being understood that the renewable heat source 105, although shown as part of the appliance 101, will generally be a separate entity), that can provide temperature-controlled heated water across a wide heat range.

Having described a hot water supply installation according to an aspect of the invention, we will now describe a method of controlling a hot water supply installation, and in particular a method of controlling a supply of heated water. This essentially involves a user signalling to a processor of the installation by modulating the output of a controllable water supply outlet.

Figure 2A:
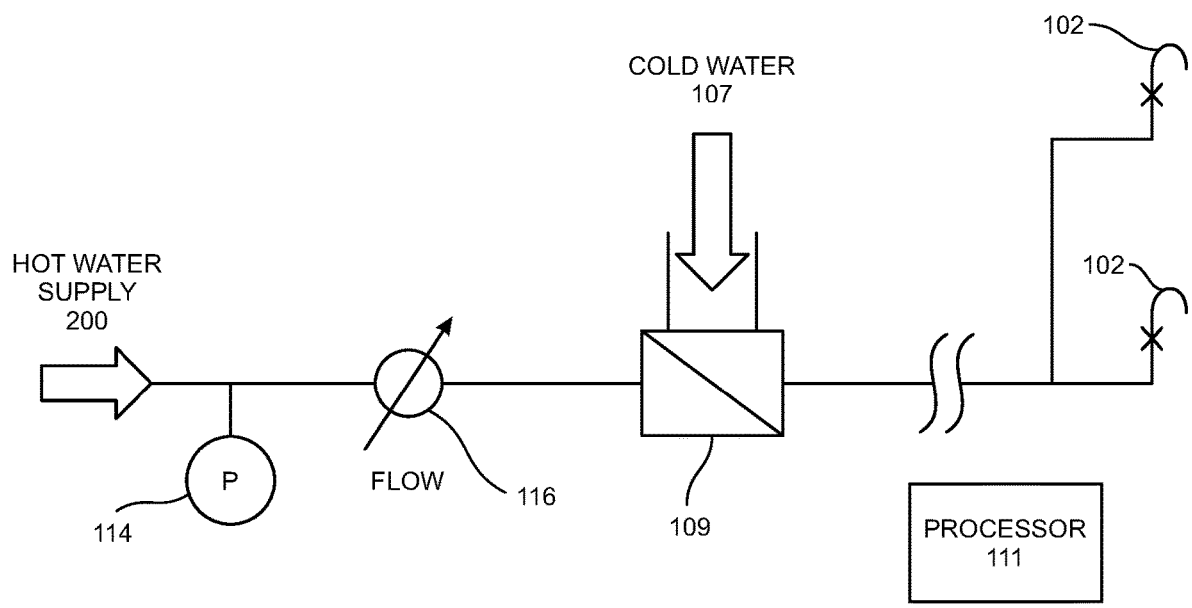
FIG. 2 illustrates schematically an approach to enable a user to issue a command that can be used to change a water temperature or some other property.

The method will be described with reference to FIG. 2, FIG. 2a of which illustrates schematically various elements of a hot water supply installation, such as that shown in FIG. 1. The controllable hot water outlets of the installation are represented by taps 102, although one or both of these outlets could be a shower outlet. These taps are supplied with hot water from a hot water supply source 200 which may correspond to the water heating appliance 101 of FIG. 1. In the supply line (which will typically be run using copper pipe) intermediate the hot water source 200 and the taps 102 is a pressure sensor 114 which senses pressure within the supply line. Mixing valve 109 is located in the hot water supply line, downstream of the pressure sensor 114. The mixing valve 109 is fed with cold water, for example from a supply 107 as shown in FIG. 1. In the supply line, intermediate the pressure sensor 114 and thermostatic mixing valve 109, is a flow controller 116 such as that shown in FIG. 1. The pressure sensor 114, mixing valve 109, and flow controller 116 are all coupled to a system processor, such as processor 111 of FIG. 1. As in the example of FIG. 1, the coupling to the processor 111 may be using a wired CAM-BUS arrangement, or may additionally or alternatively be wireless, or some combination of the two.

Figure 2B:
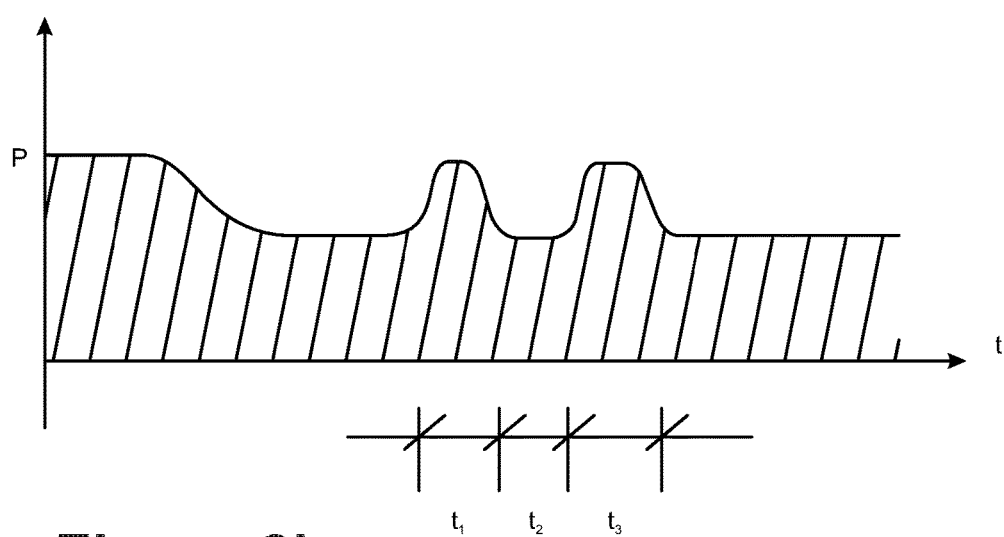

FIG. 2b illustrates schematically a method to allow a user to issue a command to a hot water supply installation. The figure illustrates how the pressure sensed by sensor 114 fluctuates over time as the result of a user opening and closing one of the taps 102. Initially, the pressure in the hot water supply installation is at the system high level, of for example 3 bar. When an outlet of the hot water supply installation is opened, the pressure in the system drops, and if the outlet is opened more than a minimal amount the pressure drop will be significant, for example more than 20%, e.g., 25 to 30%. The drop in pressure can be detected even at a considerable distance from the outlet, even possibly upstream of the appliance 101. Nevertheless, it may be preferred to include a pressure sensor or transducer 114 in the appliance 101 and/or downstream of the appliance. If the hot water supply installation includes more than one hot water supply circuit—for example separate supply lines for each of multiple floors in a building, or for different sub-units, then each such supply line should be provided with its own pressure transducer 114.

Reverting to FIG. 2b, this shows how, by opening and closing an outlet of the hot water supply system, a sequence of pressure pulses can be generated. Such a sequence can be detected using a pressure transducer 114 and hence a processor 111 coupled to the processor can determine the presence of such a sequence, enabling the sequence to be used as a control signal. Various control sequences can be pre-stored in a memory of, or associated with, the processor or the processor can be trained after installation, using a series of training sequences. Preferably, as shown in FIG. 1, the processor 111 is associated with a transceiver 110, and this means that the processor can exchange messages with a WTRU such as a smartphone (optionally loaded with an appropriate software application) to enable a user or system installer to go through a training routine in which one or more commands (e.g. increase the temperature from a first level—which may be a system default level, to a second level; increase the flow rate from a first level—which may also be a system default level, to a second level; with optionally further stepped increases being possible up to pre-set system maxima) becomes associated with a particular sequence of outlet operations. Preferably, after associating each sequence of actions with a particular command, the processor and/or the app provides mapping on a visual display of the smartphone showing for each stored command the corresponding sequence of actions to be taken with the outlet.

It will be appreciated that, in addition to creating pressure pulses in the water supply, the opening of a water supply outlet leads to water flow, while the subsequent closing of the outlet will cause the flow to cease. Considering FIG. 2*b*, we can infer that there is initially no flow, when the pressure in the system is high, then as the outlet is opened, and the pressure falls, the flow rate increases to a certain level dictated by the extent to which the outlet is opened, along with the characteristics of the system. Reclosing the outlet causes the flow to again cease (Indicated by the return of the system pressure to its pre-opening level). Opening and then reclosing the outlet again leads to flow starting and then ceasing. Thus, instead of using a pressure sensor 114 to detect a sequence of changes in a property or state of the water supply, a flow sensor can be used instead. If a flow sensor is to be used instead of a pressure sensor, then preferably the sensor is located at the outlet of the water heater 101 or even closer to the relevant water outlet. This is because while pressure pulses tend to propagate rapidly through the water supply pipework, flow fluctuations may take longer to be detected and quantified when monitored remotely from the outlet whose opening has given rise to the flow. A flow sensor may be provided at each of multiple outlets of the water supply system (not necessarily every outlet, but potentially only those from which it is desired to be able to issue commands to the water heater 101—for example one or more of the kitchen sink, shower, and bath outlets) and each of these may be provided with a corresponding RF transmitter (or transceiver) for communication with the processor 111. Additionally, or alternatively, such remotely mounted flow sensors may communicate with the processor 111 through wired connections. Pressure sensors may similarly be placed close to corresponding water outlets, and be similarly coupled to the processor 111, but in general this will not be necessary if pressure rather than flow is the monitored system property.

It is of course possible to use a combination of pressure and flow sensing.

Thus, by quickly opening and closing a tap 102 according to a particular sequence, the user can signal to the system processor 111 to change water temperature, flow or another parameter. The pressure sensor 114 is operable to detect changes in the pressure within the hot water supply installation. A processor 111 of the system is coupled to the sensor 114, the flow controller 116, and the mixing valve 109 that is coupled to a cold-water supply 107. The processor 111 determines from an output of the pressure sensor 114 the presence of, for example, two pressure pulses—code for a particular response from the processor—such as an increase in temperature to a predetermined level. A "code" can be established for the system, so that for example two pulses (from opening and quickly closing and reopening a tap twice, as shown) may signify a temperature increase to a first level, while three pulses may signify an increase to a still greater (either a system maximum temperature or predetermined temperature below the system max).

The hot water supply installation may be configured to regulate the flow rate to some or all of the controllable outlets of the installation, for example as described below with reference to FIG. 8. Such flow regulation may be used as a means of reducing water usage, as a means to reduce energy consumption, or both. For example, parents with young children may set up their hot water supply installation so that by default the bathroom taps, and maybe the kitchen sink tap, have low flow rates—so that the children playing with the water outlets don't waste too much water or energy. But with an arrangement as described with reference to FIG. 2, the parents are able to enjoy forceful showers, and full flow from the bath and kitchen taps, by using the signalling technique to cause the system controller to temporarily abandon the flow default flow control level. The system is preferably configured to revert to its established default settings after the flow ceases, so that on a subsequent opening of an outlet the flow rate is once again limited to the default level. Of course, the system may be configured so that a forceful shower may be delivered with the system regulating the flow rate to a level below the maximum achievable flow rate—so that some saving of water and possibly energy is achieved.

The hot water supply installation may additionally or alternatively be configured to regulate the maximum temperature deliverable to some or all of the hot water outlets, for reasons of safety or economy or both. This may be achieved by routinely mixing cold water in with the hot water supplied by the water heater 101, using for example a mixing valve such as valve 109 of FIG. 1. So, for example, the energy store 104 may be configured to have an operating temperature in excess of 50 C, e.g., in the range 50 to 60 C, and the system processor 111 may be configured to mix hot water with cold water to achieve a hot water supply temperature of between 40 and 45 C. Such a configuration potentially reduces the risk of scalding to children, the elderly, or the infirm when they use hot water outlets unassisted. But the carers or householders may wish to be able to run water at higher temperatures when they are in control. For example, the householder may periodically wish to run the system to deliver water at more than 50 Celsius, and preferably at least 60 Celsius, to disinfect the hot water supply system, reducing the threat from *Legionella*. The method described with reference to FIG. 2 can be used, with an appropriately programmed system, to control the system to enable such a disinfection process. Similarly, the system can be configured to enable the householder to override a default temperature setting when using a kitchen tap, when hotter water is required for washing greasy pans and cookware, or for scalding certain ingredients. Indeed, the possible uses of the system are numerous and diverse. The system may also use the signalling method described with reference to FIG. 2 as a means of enabling a user to turn on an additional heat source, such as instant water heater 106—something which may be particularly useful when disinfecting the system to combat *Legionella*, for example.

Figure 3:
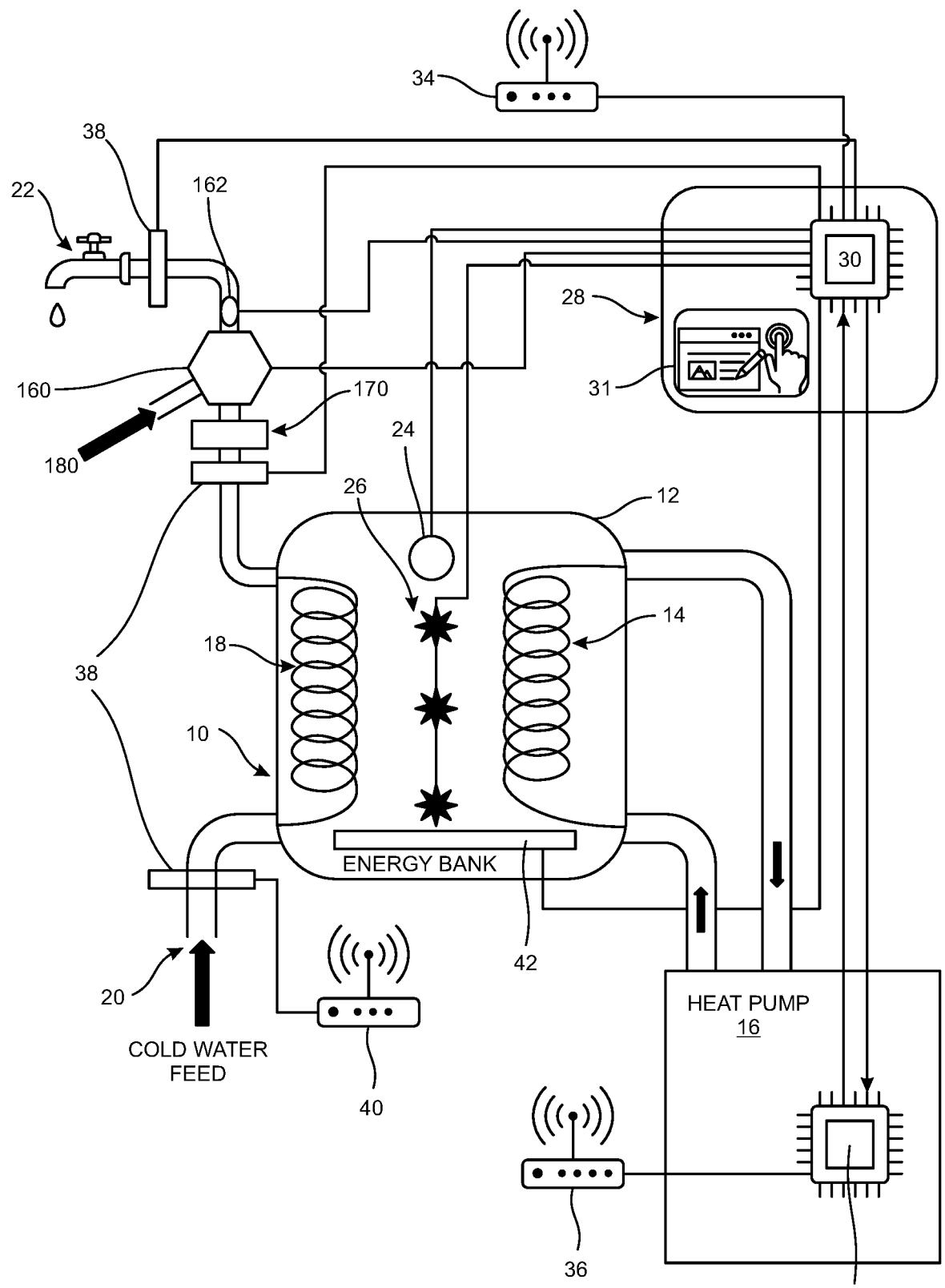
FIG. 3 is a schematic diagram showing an energy bank including a phase change material and a heat exchanger coupled to a heat pump energy source, the energy bank including one or more sensors to provide measurement data indicative of the amount of energy stored as latent heat in the phase change material.

FIG. 3 shows schematically an energy bank 10 including a heat exchanger, the energy bank comprising an enclosure 12. Within the enclosure 12 are an input-side circuit 14 of the heat exchanger for connection to an energy source—shown here as a heat pump 16, an output-side circuit 18 of the heat exchanger for connection to an energy sink—shown here as a hot water supply system connected to a cold-water feed 20 and including one or more outlets 22. Within the enclosure 12 is a phase-change material for the storage of energy. The energy bank 10 also includes one or more status sensors 24, to provide a measurement of indicative of a status of the PCM. For example, one or more of the status sensors 24 may be a pressure sensor to measure pressure within the enclosure. Preferably the enclosure also includes one or more temperature sensors 26 to measure temperatures within the phase change material (PCM). If, as is preferred, multiple temperature sensors are provided within the PCM, these are preferably spaced apart from the structure of the input and output circuits of the heat exchanger, and suitably spaced apart within the PCM to obtain a good "picture" of the state of the PCM.

The energy bank 10 has an associated system controller 28 which includes a processor 30. The controller may be integrated into the energy bank 10 but is more typically mounted separately. The controller 28 may also be provided with a user interface module 31, as an integrated or separate unit, or as a unit that may be detachably mounted to a body containing the controller 28. The user interface module 31 typically includes a display panel and keypad, for example in the form of a touch-sensitive display. The user interface module 31, if separate or separable from the controller 28 preferably includes a wireless communication capability to enable the processor 30 of controller 28 and the user interface module to communicate with each other. The user interface module 31 is used to display system status information, messages, advice and warnings to the user, and to receive user input and user commands—such as start and stop instructions, temperature settings, system overrides, etc.

The status sensor(s) is/are coupled to the processor 30, as is/are the temperature sensor(s) 26 if present. The processor 30 is also coupled to a processor/controller 32 in the heat pump 16, either through a wired connection, or wirelessly using associated transceivers 34 and 36, or through both a wired and a wireless connection. In this way, the system controller 28 is able to send instructions, such as a start instruction and a stop instruction, to the controller 32 of the heat pump 16. In the same way, the processor 30 is also able to receive information from the controller 32 of the heat pump 16, such as status updates, temperature information, etc.

The hot water supply installation also includes one or more flow sensors 38 which measure flow in the hot water supply system. As shown, such a flow sensor may be provided on the cold-water feed 20 to the system, and or between the output of the output-side circuit 18 of the heat exchanger. Optionally, one or more pressure sensors may also be included in the hot water supply system, and again the pressure sensor(s) may be provided upstream of the heat exchanger/energy bank, and/or downstream of the heat exchanger/energy bank—for example alongside one or more of the one or more flow sensors 38. The or each flow sensor, the or each temperature sensor, and the or each pressure sensor is coupled to the processor 30 of the system controller 28 with either or both of a wired or wireless connection, for example using one or more wireless transmitters or transceivers 40. Depending upon the nature(s) of the various sensors 24, 26, and 38, they may also be interrogatable by the processor 30 of the system controller 28.

An electrically controlled thermostatic mixing valve 160 is preferably coupled between the outlet of the energy bank and the one or more outlets of the hot water supply system and includes a temperature sensor 162 at its outlet. An additional instantaneous water heater, 170, for example an electrical heater (inductive or resistive) controlled by the controller 28, is preferably positioned in the water flow path between the outlet of the energy bank and the mixing valve 160. A further temperature sensor may be provided to measure the temperature of water output by the instantaneous water heater 170, and the measurements provided to the controller 28. The thermostatic mixing valve 160 is also coupled to a cold-water supply 180 and is controllable by the controller 28 to mix hot and cold water to achieve a desired supply temperature.

Optionally, as shown, the energy bank 10 may include, within the enclosure 12, an electrical heating element 42 which is controlled by the processor 30 of the system controller 28, and which may on occasion be used as an alternative to the heat pump 16 to recharge the energy bank.

FIG. 3 is merely a schematic, and only shows connection of the heat pump to a hot water supply installation. It will be appreciated that in many parts of the world there is a need for space heating as well as hot water. Typically, therefore the heat pump 16 will also be used to provide space heating. An exemplary arrangement in which a heat pump both provides space heating and works with an energy bank for hot water heating will be described later in the application. For ease of description the following description of a method of operation of an energy bank according to an aspect of the invention, for example as illustrated in FIG. 3, applies equally to the energy bank installation whether or not the associated heat pump provides space heating.

Figure 4:
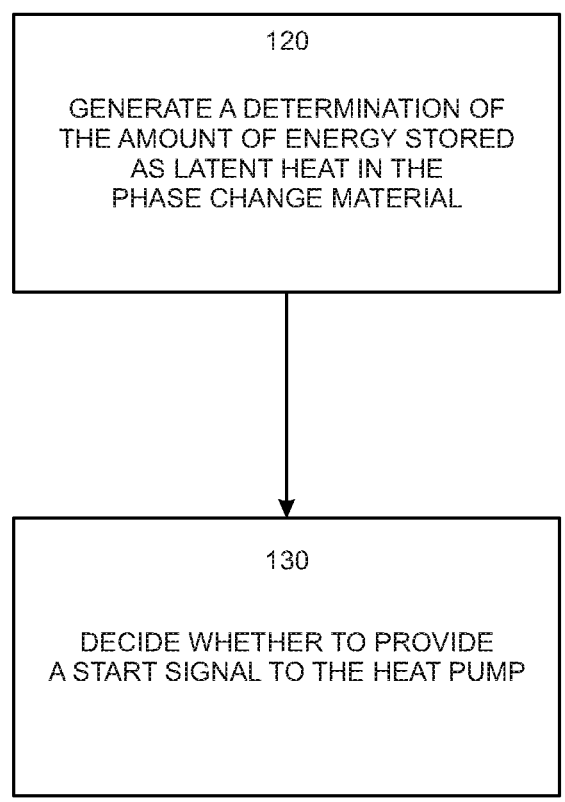
FIG. 4 is a high level flow chart for a method performed by an installation including an energy bank such as that of FIG. 3.

A method of controlling an installation according to an aspect of the invention will now be described with reference to FIG. 4. FIG. 4 is a simplified flow chart illustrating various actions performed by a processor associated with an installation according to any variant of the third or fourth aspect of the invention.

The method begins at 120 with generating a determination of the amount of energy stored as latent heat in the phase change material, based on information from one or more of the status sensors 24.

Then, at step 130, based at least in part on that determination, the processor decides whether to provide a start signal to the heat pump. Various factors which the processor may take into account in addition to the status of the PCM are introduced and discussed later in the specification.

Figure 5:
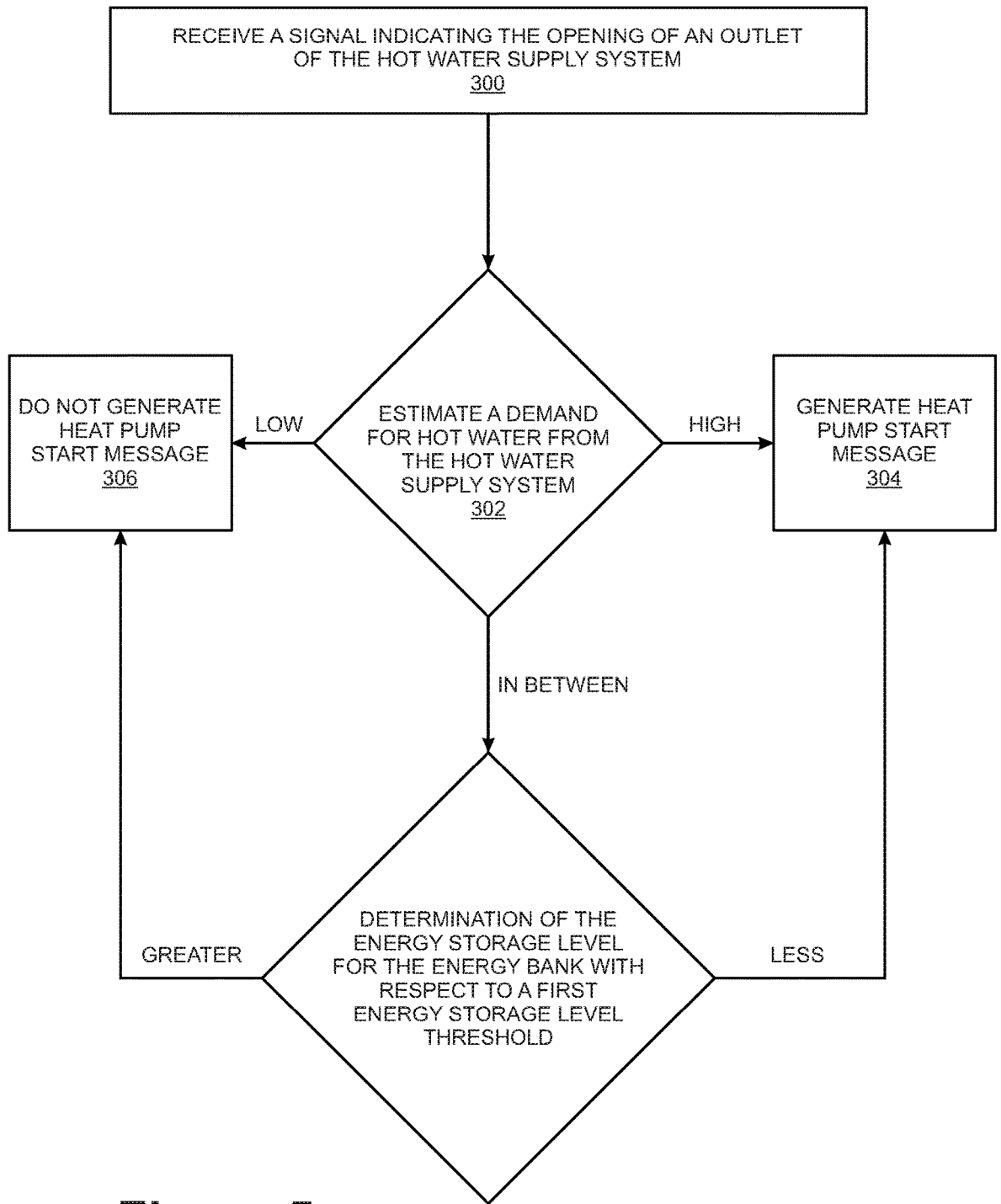
FIG. 5 is a high-level flow chart for another method performed by an energy bank such as that of FIG. 3.

FIG. 5 is another simplified flow chart illustrating various actions performed by a processor associated with an installation according to any variant of the third or fourth aspect of the invention.

The method begins at 300 with the processor receiving a signal indicating the opening of an outlet of the hot water supply system. The signal may for example come from a flow sensor 38 in the hot water supply system, or in the cold-water feed to the hot water system. At 302 the processor estimates a demand for hot water from the hot water supply system, based for example on an identity or type of the outlet that has been opened, or based on an instantaneous flow rate. The processor compares the estimated demand with a first threshold demand level. If the estimated demand is above the first threshold demand level, the processor generates at 304 a heat pump start message. If the estimated demand is below the first threshold demand level, the processor compares the estimated demand with a second threshold demand level, lower than the first. If the estimated demand is below the second threshold demand level, the processor determines at 306 to not to generate a heat pump start message.

If the estimated demand is between the first and the second threshold demand levels, the processor takes account to the energy storage level of the energy bank. This may involve the processor establishing afresh the energy storage level of the energy bank, or the processor may use recently generated information on the energy storage level of the energy bank.

If the determination of the energy storage level for the energy bank is greater than a first energy storage level threshold, the processor determines at 304 not to generate a heat pump start message. Conversely, if the determination of the energy storage level for the energy bank is less than the first energy storage level threshold, the processor determines to generate a heat pump start message at 304.

Figure 6:
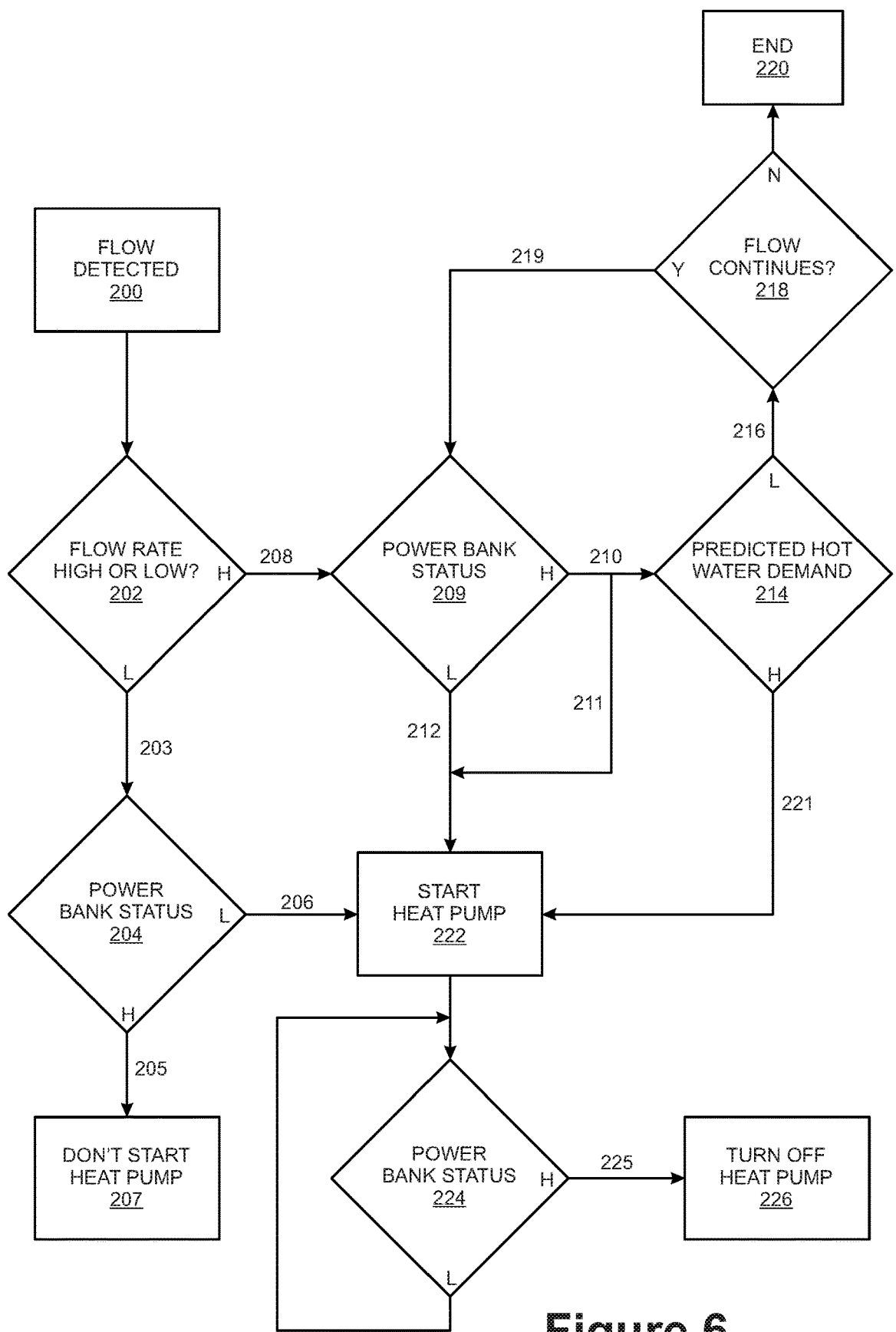
FIG. 6 is a flow chart for another method performed by an energy bank such as that of FIG. 3.

A method of controlling an installation according to an aspect of the invention will now be described with reference to FIG. 6. FIG. 6 is a simplified flow chart illustrating various actions performed by a processor associated with an energy bank such as that illustrated in FIG. 3. The process begins at step 200 when the processor 30 detects a flow of water in the hot water supply system. Detection is preferably based on data from a flow sensor such as flow sensor 38 of FIG. 3 but could alternatively be based on data from a pressure sensor in the hot water supply system. The relevant sensor may be configured continuously to supply measurement data to the processor 30 or may be configured only to report changes in the measurement data, or the processor may continuously or periodically (for example at least once per second) read the relevant sensor(s).

At step 202 the processor 30 determines whether the flow rate indicated by the data from the sensor(s) indicate a high or a low flow, for example above or below a particular threshold. The processor may use more than one threshold to categorize the flow rate as high, medium, or low, or the categories could include very high, high, medium, and low. There may also be a category of very low or de minimus flow. The processor 30 may also be provided with information (e.g. in the form of a database, model, or MLA) about flow rates and flow signatures for each of the outlets 22, or each of the outlet types, of the hot water supply system (for example using a technique such as that described later in this patent application), the processor then characterising the detected flow rate as associated with a particular one of the outlets 22 or a particular type (shower outlet, bath outlet, kitchen sink outlet, washbasin outlet, handbasin outlet, for example).

If the determination indicates that the demand for hot water is low 203, the processor then, in step 204, takes account of the status of the power bank 10, based on information from at least the status sensor 24. The processor 30 may interrogate the status sensor 24 (e.g., a pressure sensor) at this stage, or may check a recently updated energy bank status, in either case determining whether the energy bank is in a high energy state 205 (with a large proportion of the potential latent heat capacity of the energy bank available for use) or in a low energy state 206 (with a small proportion of the potential latent heat capacity of the energy bank available for use). The processor may also take account of information from the temperature sensor(s) 26, for example to take account of sensible energy stored in the energy bank 10. If the processor 30 determines a high energy state, the processor determines not to send a start instruction to the heat pump, and the process terminates at 207. If the processor 30 determines a low energy state, the processor may then determine at 206 to send 222 a start instruction to the heat pump.

If the determination indicates that the demand for hot water is high 208, the processor may then, in step 209, takes account of the status of the power bank 10, based on information from at least the status sensor 24. The processor 30 may interrogate the status sensor 24 at this stage, or may check a recently updated energy bank status, in either case determining whether the energy bank is in a high energy state 210 (with a large proportion of the potential latent heat capacity of the energy bank available for use) or in a low energy state 212 (with a small proportion of the potential latent heat capacity of the energy bank available for use).

The processor may also take account of information from the temperature sensor(s) 26, for example to take account of sensible energy stored in the energy bank 10. If the processor 30 determines a high energy state 210, the processor optionally determines a predicted hot water demand in step 214. But the processor may alternatively be configured to issue an instruction to start the heat pump at 222 based simply on the magnitude of the flow rate, and without predicting hot water demand (as indicated by the cross-hatched arrow 211).

In step 214, the processor 30 may take account of the determined identity (i.e., a particular outlet) or type of water outlet to predict hot water demand. For example, if the outlet is identified as a kitchen sink outlet, it is unlikely that the tap will be run for more than 30 seconds to a minute. Whereas, if the outlet is a bath tap, the tap is likely to remain open for several minutes with a demand for perhaps 120 to 150 litres of hot water.

In the first situation, the processor 30 will determine at 216 not to send a start signal to the heat pump, but will instead either end the process, or more preferably continue to monitor the flow rate at 218 to see how long the flow continues. If the flow stops within the predicted time, the process ends at 220, but if the flow of water continues for longer than predicted, the processor moves at 219 back to step 209. In the second situation, the processor 30 will determine at 221 to send 222 a start signal to the heat pump (and the arrow 211 indicates a decision to start the heat pump based simply on the instantaneous flow rate or the identification of the outlet (or outlet type) as being associated with the withdrawal of significant volumes of hot water from the hot water supply system.

After starting the heat pump at 222 (either from the determination at 206 or at 221), the processor 30 continues at 224 to monitor (periodically or continuously) the power bank status, until the status reaches some threshold level of charge 225, at which the processor sends a signal 226 to turn off the heat pump.

Figure 7:
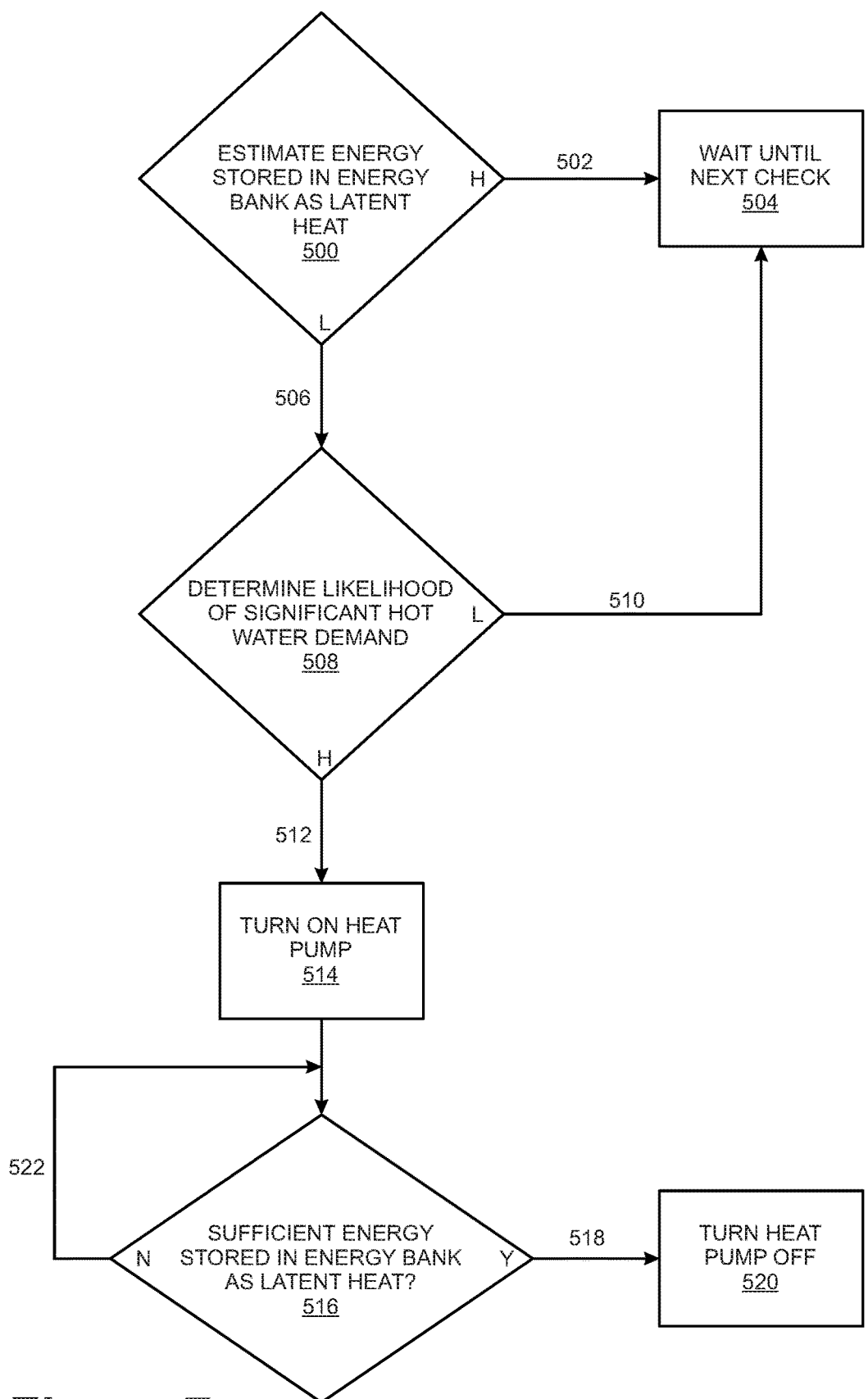
FIG. 7 is a flow chart for another method performed by an energy bank such as that of FIG. 1.

FIG. 7 is another simplified flow chart illustrating various actions performed by a processor associated with the energy bank, such as processor 30 of FIG. 3. Unlike the method described with reference to FIG. 6, the method of FIG. 7 is not dependent on detection of a call for hot water, i.e. not dependent on the opening of an outlet of the hot water system. Generally, FIG. 7 illustrates a method of controlling an installation, the method comprising generating a determination of the amount of energy stored as latent heat in the phase change material; and based on that determination deciding whether to provide a start signal to the heat pump. Although, as will be seen, an optional but preferred step may take place between the step of generating a determination of the amount of energy stored as latent heat in the phase change material, and the step of, based on that determination, deciding whether to provide a start signal to the heat pump.

The method begins at step 500 with the processor 30 estimating the amount of energy stored in the phase change material of the energy bank 10 as latent heat. The amount of heat may be an absolute amount in kJoules but may equally well be simply a measure of the proportion of the potential latent heat capacity that is currently available. In other words, the processor may effectively determine the proportion of the phase change material that is still in the phase with the higher energy state. So, for example, if the phase change material is a paraffin wax, with a phase change from liquid to solid, the liquid phase is the higher energy phase, incorporating the latent heat of fusion, and the solid phase is the lower energy phase, the latent heat of fusion having been given up on solidification.

If the processor determines that the amount of energy stored as latent heat is sufficient 502, i.e. exceeds some predetermined threshold, the method moves to step 504 at which the process halts, and the processor awaits the next check 500.

If the processor determines that the amount of energy stored as latent heat is not sufficient 506, i.e. is at or below some predetermined threshold the method moves to step 508. At step 508, the processor determines the likelihood of significant hot water demand within a coming period of time (e.g., within the next half hour, hour, 2, 3, or 4 hours). The period of time considered is a factor of the heat capacity of the energy bank, the size of the energy shortfall determined, and the capacity of the heat pump to recharge the energy bank under those circumstances. It will be appreciated that the demand period considered should be great enough to enable the heat pump to recharge the energy bank sufficiently within the period so that the energy bank will be optimally charged (possibly fully charged) to be able to cope with the predicted or anticipated demand. Conversely, the heat pump should not be being used to recharge the energy bank so long in advance of the expected/predicted energy demand that the energy bank will lose a significant quantity of energy through radiation, conduction, or convection.

The processor may rely on a database, model, calendar or schedule, and any and all of these may include learned behaviours and patterns of behaviour, and scheduled events (such as scheduled absences or events scheduled for some other location). The processor may also have access to local weather reports, for example provided (pushed or received) over the Internet, or in a radio transmission, and/or an external thermometer. If the processor determines 510 that there is a low likelihood of significant hot water demand within the period, the method moves to step 504 at which the process halts, and the processor awaits the next check 500.

If the processor determines 512 that there is a high likelihood of significant hot water demand within the period, the method moves to step 514 at which the heat pump is turned on: for example, the processor 30 sends an instruction to the heat pump 16, so that the processor 32 of the heat pump initiates the heat pump starting procedure, after which the heat pump starts to supply heat to the input side of the heat exchanger, thereby putting energy into the phase change material. The processor then, in step 516, repeatedly determines whether sufficient energy is now stored in the energy bank as latent heat of the phase change material. Once the processor has determined 518 that sufficient energy is now stored in the energy bank as latent heat of the phase change material, the method moves to step 520, and the heat pump is turned off, for example by the processor 30 sending an appropriate instruction. As long as the processor determines 522 that insufficient energy is stored, the method continues.

Referring back to FIG. 3, instead of or in addition to providing one or more status sensors 24 to measure pressure within the enclosure, other sensor types can be provided to measure optical properties, such as transparency, absorption, refraction, refractive index, of the PCM, because various of these change with phase transitions in the PCM. In addition, various of these properties may exhibit a wavelength dependence that changes with a change of phase.

The energy bank may therefore further comprise one or more optical sources to launch light into the phase change material, and the one or more status sensors 24 may include an optical sensing arrangement to detect light launched from the optical source (s) after the light has passed through the phase change material. The change between phases in the phase change material gives rise to reversible changes in optical properties of the phase change material, and hence observing optical properties of the PCM can be used to glean information about the state of the PCM. Preferably, optical properties of the PCM are observed in several areas of the PCM, and preferably in different directions within the material. For example, optical sources and sensors may be arranged so that light from the source(s) passes lengthwise through the PCM at one or more positions, and other source(s) and sensor(s) may be arranged so that light from the source(s) passes width wise through the PCM at one or more positions and in one or more orientations (through the width and or through the thickness).

The optical source(s) may be controllable to produce light of different colours and the optical sensing arrangement(s) may be configured to detect at least some of different colours. By selecting appropriate colours of light, based on the particular PCM chosen for any application, it may be possible to determine more accurately the extent to which the phase of the PCM has changed. Preferably the optical source comprises a plurality of separately activatable devices. Coupling the optical sensing arrangement to a processor which is configured to estimate an amount of energy stored in the phase change material based on information received from the optical sensing arrangement provides a means of determining the amount of energy stored as latent heat within the PCM, and this information can be used in controlling the heat pump. In particular, such information may make possible more efficient and appropriate use of the heat pump in charging the PCM energy bank.

As a further option, the one or more status sensors 24 to provide measurement data indicative of the amount of energy stored as latent heat in the phase change material may include an acoustic source configured to launch sound into the phase change material, and an acoustic sensing arrangement to detect sound launched from the acoustic source after the sound has passed through the phase change material. The change between phases in the phase change material gives rise to reversible changes in sound absorbing properties of the phase change material, and hence observing sonic properties of the PCM can be used to glean information about the state of the PCM. The acoustic source may be configured to produce ultrasound.

Figure 8:
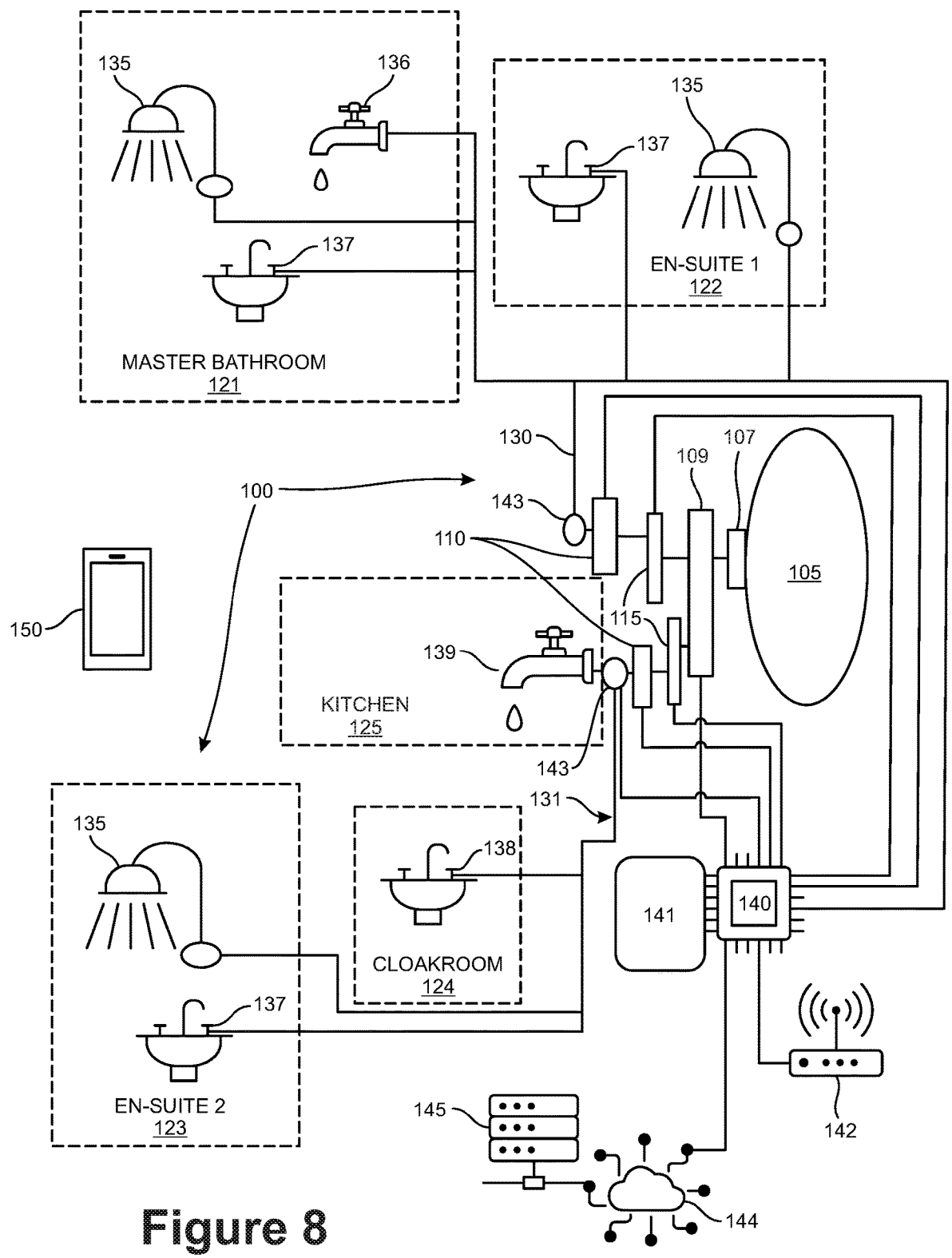
FIG. 8 is a schematic diagram showing an in-building water supply installation according to an aspect of the disclosure.

FIG. 8 shows schematically an in-building water supply installation 100 having a plurality of controllable water outlets (various taps and showers that will be described more fully later), a supply of water 105, and in a water flow path between the supply of water 105 and the plurality of controllable water outlets, at least one flow measurement device 110 and at least one flow regulator 115, and a processor 140 operatively connected to the at least one flow measurement device 110 and the at least one flow regulator 115. The illustrated water supply installation represents a dwelling with a master bathroom 121, a first en-suite shower room 122, a second en-suite shower room 123, a cloakroom 124, and a kitchen 125. The master bathroom and the first en-suite shower room may be on one floor of the dwelling, whereas the cloakroom, second en-suite and kitchen may be on another floor of the dwelling. In such a situation, it may be convenient to have, as shown, two separate circuits, 130 and 131, to supply water to the various outlets.

The master bathroom 121 is shown as including a shower outlet 135, a bath tap or faucet 136, and a tap 137 for a sink. The en-suite shower rooms 122 and 123 also include a shower outlet 135, and a tap 137 for a sink. Conversely, the cloakroom contains just a W.C. (not shown) and a hand basin with a tap 138. Finally, the kitchen has a sink with a tap 139.

A processor, or system controller, 140, with an associated memory 141, is coupled to the at least one flow measurement device 110 and the at least one flow regulator 115. It will be appreciated that each of the two circuits 130 and 131 is provided with a respective flow measurement device 110 and flow regulator 115 The processor is also optionally connected to one or more temperature sensors 143, one for each of the circuits 130 and 131. This processor may be associated with an energy bank as previously described.

The processor is also coupled to an RF transceiver 142, which includes at least one RF transmitter and at least one RF receiver, for bidirectional communication via Wi-Fi, Bluetooth, or the like, and preferably also to the Internet 144 for connection to a server or central station 145, and optionally to a cellular radio network (such as LTE, UMTS, 4G, 5G, etc.). By means of the RF transceiver 142 and/or the connection to the Internet, the processor 140 is able to communicate with a mobile device 150, which may for example be a smart phone or tablet, for use by an installation engineer in mapping the in-building water supply installation. The mobile device 150 includes software, such as a specific app, that co-operates with corresponding software in the system controller 140 and also potentially within server 145, to facilitate the mapping methods according to embodiments of the invention, and in particular to synchronize actions taken by the engineer to a clock of the system controller 140/server 145. The memory 141 contains code to enable the processor to perform a method of mapping an in-building water supply installation processor, for example during a process of commissioning a new installation. For the sake of description, consider FIG. 8 to show a hot water supply installation, although it could equally be a cold-water supply installation.

During the commissioning process an engineer will be asked by the processor/system controller 140 to define all hot water outlets (for e.g., tap, shower, bath, kitchen). The system controller will ask the engineer to fully open each of the outlets (taps, shower outlets, etc.) and will monitor the resulting water flow, by means of the relevant flow measurement device 110. During this process, the relevant flow measurement device 110 will measure water flow and the processor will receive these data and will add the results to a database. Based on this information, the system will subsequently be able to provide the most efficient flow into each single tap, by controlling the relevant flow control device 115, when any outlet is opened.

A method of mapping an in-building water supply installation according to a first aspect of the disclosure will now be described with reference to FIG. 8.

The method comprises opening a first of the plurality of controllable water outlets and processing signals from the at least one flow measurement device 110 with the processor 140 at least until a first flow characteristic is determined, and then closing the first of the plurality of controllable water outlets. The opening of the first of the plurality of controllable water outlets is preferably instructed by the processor or system controller 140 sending a message to the mobile device 150 carried by the relevant engineer. For example, the instruction may be sent by Wi-Fi and tell the engineer to open the hot bath tap 136 in the master bathroom 121. The engineer, carrying the mobile device 150, then goes to the master bathroom and opens the hot bath tap 136 fully. The mobile device may provide the engineer with a prompt, preferably audible and with a countdown, to tell the engineer when precisely to open the tap. Alternatively, the app on the mobile device may be configured to accept an input from the engineer, such as the pressing or release of a button, at the moment that the tap 136 is opened. In either case, the app may capture a local time for the prompt or the moment, and then send this local time, along with the identity of the relevant controllable outlet, to the system controller 140 or server 145. In this way, delays in the prompt reaching the mobile device 150 or of the timing of the instruction reaching the controller 140 or server 145 can be accounted for (the mobile device 150 and the system controller 140 preferably go through some handshaking procedure, either before or after the mapping process, so that wither offsets between the clocks of the two devices can be eliminated or they can also be accounted for).

The engineer may then work her way around the premises selecting an outlet identity from a list or menu on the app, or entering an unambiguous identifier, opening each of the outlets in turn. Or the system controller may already have been provided with a list of all the taps, etc. (generally "controllable outlets") and may prompt the engineer, by sending another message to the mobile device 150, to go to the relevant outlet. The app preferably includes the option for the engineer to send a message to the system controller 140/server 145, that she is in place and ready to receive an instruction to open the next controllable outlet. The process is then repeated for each of the other hot water outlets, until all the outlets and their flow characteristics—namely the lag before flow is detected, the rate of rise of flow, the maximum flow rate, and any other identifiable characteristics have been captured and stored in a database. By using the characteristics stored in the database, the processor 140 is then subsequently able to identify the opening of a particular one of the plurality of controllable water outlets based on the similarity of a detected flow characteristic to a respective flow characteristic.

The processor is also provided with some rules concerning preferred flow rates and, optionally, flow durations, based on the type of outlet (bath tap, kitchen tap, basin tap, cloakroom tap) and its location (main bathroom, en-suite, child's room, adult's room, cloakroom, kitchen, for example), and use these rules, along with the outlet identity recognised from the detected flow characteristics, to determine a target flow rate. The targeted flow rate is then imposed by the system controller 140 by controlling the relevant flow controller 115, and preferably monitored by the corresponding flow measurement device 110. In this way, by controlling at least one flow regulator, based on the identification of the relevant outlet, the processor 140 is able control a supply of water to the identified controllable water outlet.

Each of the respective flow characteristic may include a respective stable flow rate. The method may then further comprise configuring the processor 140 to control the at least one flow regulator 115 to impose at least a 10% cut in the flow rate to each of each of the plurality of controllable water outlets, based on the respective stable flow rate. Optionally, the method may further comprise configuring the processor 140 to control the at least one flow regulator 115 to impose at least a 10% cut in the flow rate, based on respective stable flow rate, to any of the plurality of controllable water outlets whose respective stable flow rate is greater than 7 litres per minute. This is of particular application for taps that serve basins in bathrooms, en suites, and most particularly cloakrooms, where taps are often largely used to provide water for handwashing—which can be achieved effectively with quite modest flow rates.

The above-described technique of mapping a hot water supply installation may be used to populate a database or train logic, such as a neural network or machine learning algorithm (MLA), which may be used by a processor associated with an energy bank as previously described, so that the processor is better able to identify a particular outlet or outlet type from detected flow behaviour and hence to more readily estimate a demand for hot water from a hot water supply. This in turn may improve the efficiency of controlling the heat pump and of using the energy bank.

Having described an energy bank and the installation and operation of an energy bank in a hot water supply installation, we will now consider how the energy bank and heat pump may be integrated into both a hot water supply system and a space heating arrangement.

Figure 9:
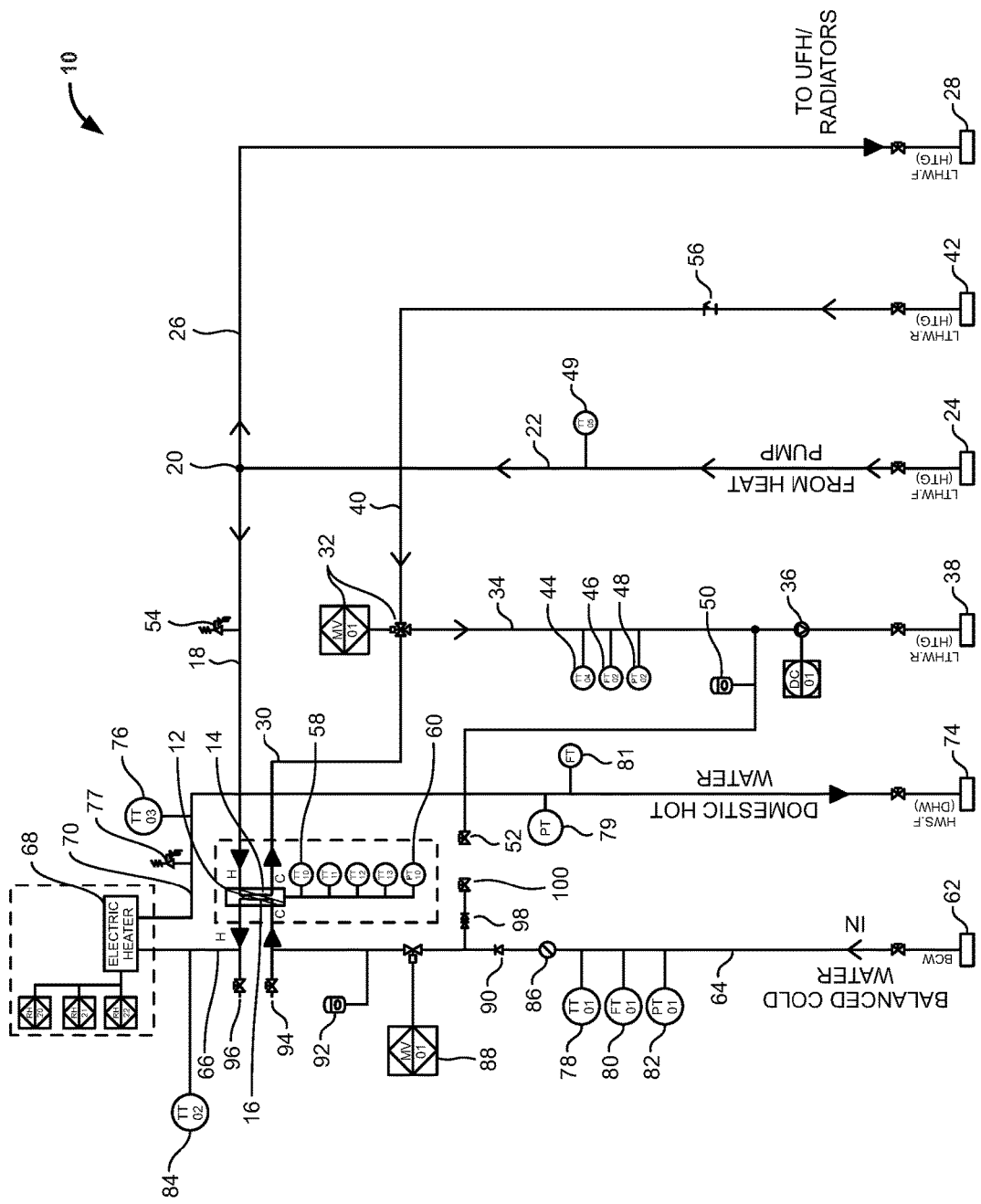
FIG. 9 is a schematic diagram showing a potential arrangement of components of an interface unit, incorporating energy bank according to an aspect of the disclosure.

FIG. 9 shows schematically a potential arrangement of components of an interface unit 10 according to an aspect of the disclosure. The interface unit interfaces between a heat pump (not shown in this Figure) and an in-building hot water system. The interface unit includes a heat exchanger 12 comprising an enclosure (not separately numbered) within which is an input-side circuit, shown in very simplified form as 14, for connection to the heat pump, and an output-side circuit, again shown in very simplified form as 16, for connection to the in-building hot water system (not shown in this Figure). The heat exchanger 12 also contains a thermal storage medium for the storage of energy, but this is not shown in the Figure. In the example that will now be described with reference to FIG. 9 the thermal storage medium is a phase-change material. It will be recognised that the interface unit corresponds to be previously described energy bank. Throughout this specification, including the claims, references to energy bank, thermal storage medium, energy storage medium and phase change material should be considered to be interchangeable unless the context clearly requires otherwise.

Typically, the phase-change material in the heat exchanger has an energy storage capacity (in terms of the amount of energy stored by virtue of the latent heat of fusion) of between 2 and 5 MJoules, although more energy storage is possible and can be useful. And of course, less energy storage is also possible, but in general one wants to maximise (subject to practical constraints based on physical dimensions, weight, cost and safety) the potential for energy storage in the phase-change material of the interface unit 10. More will be said about suitable phase-change materials and their properties, and also about dimensions etc. later in this specification.

The input side circuit 14 is connected to a pipe or conduit 18 which is in turn fed from node 20, from pipe 22 which has a coupling 24 for connection to a feed from a heat pump. Node 20 also feeds fluid from the heat pump to pipe 26 which terminates in a coupling 28 which is intended for connection to a heating network of a house or flat—for example for plumbing into underfloor heating or a network of radiators or both. Thus, once the interface unit 10 is fully installed and operational, fluid heated by a heat pump (which is located outside the house or flat) passes through coupling 24 and along pipe 22 to node 20, from where, depending upon the setting of a 3-port valve 32, the fluid flow passes along pipe 18 to the input-side circuit 14 of the heat exchanger, or along pipe 26 and out through coupling 28 to the heating infrastructure of the premises.

Heated fluid from the heat pump flows through the input-side circuit 14 of the heat exchanger and out of the heat exchanger 12 along pipe 30. In use, under some circumstance, heat carried by the heated fluid from the heat pump gives up some of its energy to the phase change material inside the heat exchanger and some to water in the output-side circuit 16. Under other circumstances, as will be explained later, fluid flowing through the input-side circuit 14 of the heat exchanger actually acquires heat from the phase change material.

Pipe 30 feeds fluid that leaves the input-side circuit 14 to a motorized 3-port valve 32 and then, depending upon the status of the valve out along pipe 34 to pump 36. Pump 36 serves to push the flow on to the external heat pump via coupling 38.

The motorized 3-port valve 32 also receives fluid from pipe 40 which receives, via coupling 42, fluid returning from the heating infrastructure (e.g., radiators) of the house or flat.

Between the motorized 3-port valve 32 and the pump 36 a trio of transducers are provided: a temperature transducer 44, a flow transducer 46, and a pressure transducer 48. In addition, a temperature transducer 49 is provided in the pipe 22 which brings in fluid from the output of the heat pump. These transducers, like all the others in the interface unit 10, are operatively connected to or addressable by a processor, not shown, which is typically provided as part of the interface unit—but which can be provided in a separate module.

Although not illustrated in FIG. 9, an additional electrical heating element may also be provided in the flow path between the coupler 24, which receives fluid from the output of the heat pump. This additional electrical heating element may again be an inductive or resistive heating element and is provided as a means to compensate for potential failure of the heat pump, but also for possible use in adding energy to the thermal storage unit (for example based on the current energy cost and predicted for heating and/or hot water. The additional electrical heating element is also of course controllable by the processor of the system.

Also coupled to pipe 34 is an expansion vessel 50, to which is connected a valve 52 by means of which a filling loop may be connected to top up fluid in the heating circuit. Also shown as part of the heating circuit of the interface unit are a pressure relief valve 54, intermediate the node 20 and the input-side circuit 14, and a strainer 56 (to capture particulate contaminants) intermediate coupling 42 and the 3-port valve 32. The heat exchanger 12 is also provided with several transducers, including at least one temperature transducer 58, although more (e.g., up to 4 or more) are preferable provided, as shown, and a pressure transducer 60. In the example shown, the heat exchanger includes 4 temperature transducers uniformly distributed within the phase change material so that temperature variations can be determined (and hence knowledge obtained about the state of the phase change material throughout its bulk). Such an arrangement may be of particular benefit during the design/implementation phase as a means to optimise design of the heat exchanger—including in optimising addition heat transfer arrangements. But such an arrangement may also continue to be of benefit in deployed systems as having multiple sensors can provide useful information to the processor and machine learning algorithms employed by the processor (either of just the interface unit, and/or of a processor of a system including the interface unit.

The arrangement of the cold-water feed and the hot water circuit of the interface unit 10 will now be described. A coupling 62 is provided for connection to a cold feed from a water main. Typically, before water from the water main reaches the interface unit 10, the water will have passed through an anti-syphon non-return valve and may have had its pressure reduced. From coupling 62 cold water passes along pipe to the output-side circuit 16 of the heat exchanger 12. Given that we provide a processor that is monitoring numerous sensors in the interface unit, the same processor can optionally be given one more task to do. That is to monitor the pressure at which cold water is delivered from the mains water supply. To this end, a further pressure sensor can be introduced into the cold water supply line upstream of coupling 62, and in particular upstream of any pressure reducing arrangement within the premises. The processor can then continually or periodically monitor the supplied water pressure, and even prompt the owner/user to seek compensation from the water supply company if the water main supplies water at a pressure below the statutory minimum.

From the output-side circuit 16 water, which may have been heated by its passage through the heat exchanger, passes along a pipe 66 to an electrical heating unit 68. The electrical heating unit 68, which is under the control of the processor mentioned previously, may comprise a resistive or inductive heating arrangement whose heat output can be modulated in accordance with instructions from the processor.

The processor is configured to control the electrical heater, based on information about the status of the phase-change material and of the heat pump.

Typically, the electrical heating unit 68 has a power rating of no more than 10 kW, although under some circumstances a more powerful heater, e.g., 12 kW, may be provided.

From the electric heater 68, what will by now hot water passes along a pipe 70 to a coupling 74 to which the hot water circuit, including controllable outlets such as taps and showers, of the house or flat will be connected.

A temperature transducer 76 is provided after the electric heater 68, for example at the outlet of the electric heater 68 to provide information on the water temperature at the outlet of the hot water system. A pressure relief valve 77 is also provided in the hot water supply, and while this is shown as being located between the electric heater 68 and the outlet temperature transducer 76, its precise location is unimportant—as indeed is the case for many of the components illustrated in FIG. 9.

Also somewhere in the hot water supply line is a pressure transducer 79 and or a flow transducer 81 either of which can be used by the processor to detect a call for hot water—i.e., detect the opening of a controllable outlet such as a tap or shower. The flow transducer is preferably one which is free from moving parts, for example based on sonic flow detection or magnetic flow detection. The processor can then use information from one or both of these transducers, along with its stored logic, to decide whether to signal to the heat pump to start.

It will be appreciated that the processor can call on the heat pump to start either based on demand for space heating (e.g., based on a stored program either in the processor or in an external controller, and/or based on signals from one or more thermostats—e.g., room stats, external stats, underfloor heating stats) or demand for hot water. Control of the heat pump may be in the form of simple on/off commands but may also or alternatively be in the form of modulation (using, for example, a Mod Bus).

As is the case with the heating circuit of the interface unit, a trio of transducers are provided along the cold-water feed pipe 64: a temperature transducer 78, a flow transducer 80, and a pressure transducer 82. Another temperature transducer 84 is also provided in pipe 66 intermediate the outlet of the output-side circuit 16 of the heat exchanger 12 and the electric heater 68. These transducers are again all operatively connected to or addressable by the processor mentioned previously.

Also shown on the cold-water supply line 64 are a magnetic or electrical water conditioner 86, a motorised and modulatable valve 88 (which like all the motorised valves may be controlled by the processor mentioned previously), a non-return valve 90, and an expansion vessel 92. The modulatable valve 88 can be controlled to regulate the flow of cold water to maintain a desired temperature of hot water (measured for example by temperature transducer 76).

Valves 94 and 96 are also provided for connection to external storage tanks for the storage of cold and heated water respectively. Finally, a double check valve 98 connects cold feed pipe 64 to another valve 100 which can be used with a filling loop to connect to previously mentioned valve 52 for charging the heating circuit with more water or a mix of water and corrosion inhibiter.

It should be noted that FIG. 9 shows various of the pipes crossing, but unless these crossing are shown as nodes, like node 20, the two pipes that are shown as cross do not communicate with each other, as should by now be clear from the foregoing description of the Figure.

Although not shown in FIG. 9, the heat exchanger 12 may include one or more additional electrical heating elements configured to put heat into the thermal storage medium. While this may seem counter intuitive, it permits the use of electrical energy to pre-charge the thermal storage medium at times when it makes economic sense to do so, as will now be explained.

It has long been the practice of energy supply companies to have tariffs where the cost of a unit of electricity varies according to the time of day, to take account of times of increased or reduced demand and to help shape customer behaviour to better balance demand to supply capacity. Historically, tariff plans were rather coarse reflecting the technology both of power generation and of consumption. But increasing incorporation of renewable energy sources of electrical power—such as solar power (e.g. from photovoltaic cells, panels, and farms) and wind power, into the power generation fabric of countries has spurred the development of a more dynamic pricing of energy. This approach reflects the variability inherent in such weather-dependent power generation. Initially such dynamic pricing was largely restricted to large scale users, increasingly dynamic pricing is being offered to domestic consumers.

The degree of dynamism of the pricing varies from country to country, and also between different producers within a given country. At one extreme, "dynamic" pricing is little more than the offering of different tariffs in different time windows over the day, and such tariffs may apply for weeks, months, or seasons without variation. But some dynamic pricing regimes enable the supplier to change prices with a day's notice or less—so for example, customers may be offered today prices for half-hour slots tomorrow. Time slots of as short as 6 minutes are offered in some countries, and conceivably the lead time for notifying consumers of forthcoming tariffs can be reduced further by including "intelligence" in energy-consuming equipment.

Because it is possible to use short and medium term weather predictions to predict both the amount of energy likely to be produced by solar and wind installations, and the likely scale of power demand for heating and cooling, it becomes possible to predict periods of extremes of demand.

Some power generation companies with significant renewable generation capacity have even been known to offer negative charging for electricity—literally paying customers to use the excess power. More often, power may be offered at a small fraction of the usual rate.

By incorporating an electric heater into an energy storage unit, such as a heat exchanger of systems according to the disclosure, it becomes possible for consumers to take advantage of periods of low-cost supply and to reduce their reliance on electrical power at times of high energy prices. This not only benefits the individual consumer, but it is also beneficial more generally as it can reduce demand at times when excess demand must be met by burning fossil fuels.

The processor of the interface unit has a wired or wireless connection (or both) to a data network, such as the Internet, to enable the processor to receive dynamic pricing information from energy suppliers. The processor also preferably has a data link connection (e.g., a Mod Bus) to the heat pump, both to send instructions to the heat pump and to receive information (e.g., status information and temperature information) from the heat pump. The processor has logic which enables it* to learn the behaviour of the household, and with this and the dynamic pricing information, the processor is able to determine whether and when to use cheaper electricity to pre-charge the heating system. This may be by heating the energy storage medium using an electrical element inside the heat exchanger, but alternatively this can be by driving the heat pump to a higher-than-normal temperature—for example 60 Celsius rather than between 40 and 48 Celsius. The efficiency of the heat pump reduces when it operates at higher temperature, but this can be taken into account by the processor in deciding when and how best to use cheaper electricity.

*Because the system processor is connectable to a data network, such as the Internet and/or a provider's intranet, the local system processor can benefit from external computing power. So, for example the manufacturer of the interface unit is likely to have a cloud presence (or intranet) where computing power is provided for calculations of, for example, predicted:

occupancy; activity; tariff (short/long); weather forecasts (which may be preferable to generally available weather forecasts because they can be pre-processed for easy use by the local processor, and they may also be tailored very specifically to the situation, location, exposure of the property within which the interface unit is installed);

identification of false positives and/or false negatives.

To protect users from the risk of scalding by overheated water from the hot water supply system it is sensible to provide a scalding protection feature. This may take the form of providing an electrically controllable (modulatable) valve to mix cold water from the cold-water supply into hot water as it leaves the output circuit of the heat exchanger (the extra valve can be mounted between the nodes to which existing valves 94 and 96 previously mentioned).

FIG. 7 shows schematically what might be considered the "guts" of the interface unit but does not show any container for these "guts". An important application of interface units according to the disclosure is as a means to enable a heat pump to be used as a practical contributor to the space heating and hot water requirements of a dwelling that was previously provide with a gas-fired combination boiler (or which might otherwise have such a boiler installed), it will be appreciated that it will often be convenient both to provide a container both for aesthetics and safety, just as is the case conventionally with combi boilers. Moreover, preferably any such container will be dimensioned to fit within a form factor enabling direct replacement of a combi boiler—which are typically wall mounted, often in a kitchen where they co-exist with kitchen cabinets. Based on the form of a generally rectangular cuboid (although of course, for aesthetics, ergonomics, or safety, curved surfaces may be used for any or all of the surfaces of the container) with a height, width and depth, suitable sizes may be found in the approximate ranges:

height 650 mm to 800 mm;
  width 350 mm to 550 mm;
  depth 260 mm to 420 mm;
  for example, 800 mm high, by 500 mm wide, and 400 mm deep.

One notable distinction of interface units according to the disclosure with respect to gas combi boilers is that while the containers of the latter generally have to be made of non-combustible materials—such as steel, due to the presence of a hot combustion chamber, the internal temperatures of an interface unit will generally be considerably less than 100 Celsius, typically less than 70 Celsius, and often less than 60 Celsius. So, it becomes practical to use flammable materials such a wood, bamboo, or even paper, in fabricating a container for the interface unit.

The lack of combustion also opens up the possibility to install interface units in locations that would generally never be considered as suitable for the installation of gas combi boilers—and of course, unlike a gas combi boiler, interface units according to the disclosure, do not require a flue for exhaust gases. So, for example, it becomes possible to configure an interface unit for installation beneath a kitchen worktop, and even to make use of the notorious dead spot represented by an under counter corner. For installation in such a location the interface unit could actually be integrated into an under-counter cupboard—preferably through a collaboration with a manufacturer of kitchen cabinets. But greatest flexibility for deployment would be retained by having an interface unit that effectively sits behind some form of cabinet, the cabinet being configured to allow access to the interface unit. The interface unit would then preferably be configured to permit the circulation pump 36 to be slid out and away from the heat exchanger 12 before the circulation pump 36 is decoupled from the flow path of the input-side circuit.

Consideration can also be given to taking advantage of other space frequently wasted in fitted kitchens, namely the space beneath under-counter cupboards. There is often more a space with a height of more than 150 mm, and a depth of around 600 mm, with widths of 300, 400, 500, 600 mm or more (although allowance needs to be made for any legs supporting the cabinets). For new installations in particular, or where a combi boiler is being replaced along with a kitchen refit, it makes sense to use these spaces at least to accommodate the heat exchanger of the interface unit—or to use more than one heat exchanger unit for a given interface unit.

Particularly for interface units designed for wall mounting, although potentially beneficial whatever the application of the interface unit, it will often be desirable to design the interface unit as a plurality of modules. With such designs it can be convenient to have the heat exchanger as one of the of modules, because the presence of the phase-change material can result in the heat exchanger alone weighing more than 25 kg. For reasons of health and safety, and in order to facilitate one-person installation, it would be desirable to ensure that an interface unit can be delivered as a set of modules none of which weighs more than about 25 kg.

Such a weight constraint can be supported by making one of the modules a chassis for mounting the interface unit to a structure. For example, where an interface unit is to be wall mounted in place of an existing gas combi boiler, it can be convenient if a chassis, by which the other modules are supported, can first be fixed to the wall. Preferably the chassis is designed to work with the positions of existing fixing points used to support the combi boiler that is being replaced. This could potentially be done by providing a "universal" chassis that has fixing holes preformed according to the spacings and positions of popular gas combi boilers. Alternatively, it could be cost effective to produce a range of chassis each having hole positions/sizes/spacings to match those of particular manufacturer's boilers. Then one just needs to specify the right chassis to replace the relevant manufacturer's boiler. There are multiple benefits to this approach: it avoids the need to drill more holes for plugs to take fixing bolts—and not only does this eliminate the time needed to mark out, drill the holes and clean up, but it avoids the need to further weaken the structure of the dwelling where installation is taking place—which can be an important consideration given the low cost construction techniques and materials frequently used in "starter homes" and other low cost housing.

Preferably the heat exchanger module and the chassis module are configured to couple together. In this way it may be possible to avoid the need for separable fastenings, again saving installation time.

Preferably an additional module includes first interconnects, e.g., 62 and 74, to couple the output side circuit 16 of the heat exchanger 12 to the in-building hot water system. Preferably the additional module also includes second interconnects, e.g. 38 and 24, to couple the input side circuit 14 of the heat exchanger 12 to the heat pump. Preferably the additional module also includes third interconnects, e.g., 42 and 28, to couple the interface unit to the heat circuit of the premises where the interface unit is to be used. It will be appreciated that by mounting heat exchanger to the chassis, which is itself directly connected to the wall, rather than first mounting the connections to the chassis, the weight of the heat exchanger is kept closer to the wall, reducing the cantilever loading effect on the wall fixings that secure the interface unit to the wall.

Phase Change Materials

One suitable class of phase change materials are paraffin waxes which have a solid-liquid phase change at temperatures of interest for domestic hot water supplies and for use in combination with heat pumps. Of particular interest are paraffin waxes that melt at temperatures in the range 40 to 60 Celsius, and within this range waxes can be found that melt at different temperatures to suit specific applications. Typical latent heat capacity is between about 180 kJ/kg and 230 kJ/kg and a specific heat of perhaps 2.27 $Jg^{-1} K^{-1}$ in the liquid phase, and 2.1 $Jg^{-1} K^{-1}$ in the solid phase. It can be seen that very considerable amounts of energy can be stored taking using the latent heat of fusion. More energy can also be stored by heating the phase change liquid above its melting point. For example, when electricity costs are relatively low and it can be predicted that there will shortly be a need for hot water (at a time when electricity is likely to, or known to be going to, cost more perhaps), then it can make sense to run the heat pump at a higher-than-normal temperature to "overheat" the thermal energy store.

A suitable choice of wax may be one with a melting point at around 48 Celsius, such as n-tricosane $C_{23}$, or paraffin $C_{20}$-$C_{33}$. Applying the standard 3K temperature difference across the heat exchanger (between the liquid supplied by the heat pump and the phase change material in the heat exchanger) gives a heat pump liquid temperature of around 51 Celsius. And similarly on the output side, allowing a 3K temperature drop, we arrive at a water temperature of 45 Celsius which is satisfactory for general domestic hot water—hot enough for kitchen taps, but potentially a little high for shower/bathroom taps—but obviously cold water can always be added to a flow to reduce water temperature. Of course, if the household are trained to accept lower hot water temperatures, or if they are acceptable for some other reason, then potentially a phase change material with a lower melting point may be considered, but generally a phase transition temperature in the range 45 to 50 is likely to be a good choice. Obviously, we will want to take into account the risk of *Legionella* from storing water at such a temperature.

Heat pumps (for example ground source or air source heat pumps) have operating temperatures of up to 60 Celsius (although by using propane as a refrigerant, operating temperatures of up to 72 Celsius are possible), but their efficiencies tend to be much higher when run at temperatures in the range of 45 to 50 Celsius. So, our 51 Celsius, from a phase transition temperature of 48 Celsius is likely to be satisfactory.

Consideration also needs to be given to the temperature performance of the heat pump. Generally, the maximum $\Delta T$ (the difference between the input and output temperature of the fluid heated by the heat pump) is preferably kept in the range of 5 to 7 Celsius, although it can be as high as 10 Celsius.

Although paraffin waxes are a preferred material for use as the energy storage medium, they are not the only suitable materials. Salt hydrates are also suitable for latent heat energy storage systems such as the present ones. Salt hydrates in this context are mixtures of inorganic salts and water, with the phase change involving the loss of all or much of their water. At the phase transition, the hydrate crystals are divided into anhydrous (or less aqueous) salt and water. Advantages of salt hydrates are that they have much higher thermal conductivities than paraffin waxes (between 2 to 5 times higher), and a much smaller volume change with phase transition. A suitable salt hydrate for the current application is $Na_2S_2O_3.5H_2O$, which has a melting point around 48 to 49 Celsius, and latent heat of 200/220 kJ/kg.

In terms simply of energy storage, consideration can also be given to using PCMs with phase transition temperatures that are significantly above the 40-50 Celsius range. For example, a paraffin wax, waxes being available with a wide range of melting points:

n-henicosane $C_{24}$ which has a melting point around 40 Celsius;

n-docosane $C_{21}$ which has a melting point around 44.5 Celsius;

n-tetracosane $C_{23}$ which has a melting point around 52 Celsius;

n-pentacosane $C_{23}$ which has a melting point around 54 Celsius;

n-hexacosane $C_{26}$ which has a melting point around 56.5 Celsius;

n-heptacosane $C_{27}$ which has a melting point around 59 Celsius;

n-octacosane $C_{28}$ which has a melting point around 64.5 Celsius;

n-nonacosane $C_{23}$ which has a melting point around 65 Celsius;

n-triacosane $C_m$ which has a melting point around 66 Celsius;

n-hentriacosane $C_{31}$ which has a melting point around 67 Celsius;

n-dotriacosane $C_{32}$ which has a melting point around 69 Celsius;

n-triatriacosane $C_{33}$ which has a melting point around 71 Celsius;

paraffin $C_{22}$-$C_{45}$ which has a melting point around 58 to 60 Celsius;

paraffin $C_{21}$-$C_{50}$ which has a melting point around 66 to 68 Celsius;

RT 70 HC which has a melting point around 69 to 71 Celsius.

Alternatively, a salt hydrate such as $CH_3COONa.3H_2O$—which has a melting point around 58 Celsius, and latent heat of 226/265 kJ/kg may be used.

Thus far, the thermal energy store has largely been described as having a single mass of phase change material within a heat exchanger that has input and output circuits each in the form of one or more coils or loops. But it may also be beneficial in terms of rate of heat transfer for example, to encapsulate the phase change material in a plurality of sealed bodies—for example in metal (e.g. copper or copper alloy) cylinders (or other elongate forms)—which are surrounded by a heat transfer liquid from which the output circuit (which is preferably used to provide hot water for a (domestic) hot water system) extracts heat.

With such a configuration the heat transfer liquid may either be sealed in the heat exchanger or, more preferably, the heat transfer liquid may flow through the energy store and may be the heat transfer liquid that transfers heat from the green energy source (e.g. a heat pump) without the use of an input heat transfer coil in the energy store. In this way, the input circuit may be provided simply by one (or more generally multiple) inlets and one or more outlets, so that heat transfer liquid passes freely through the heat exchanger, without being confined by a coil or other regular conduit, the heat transfer liquid transferring heat to or from the encapsulated PCM and then on to the output circuit (and thus to water in the output circuit). In this way, the input circuit is defined by the one or more inlets and the one or more out for the heat transfer liquid, and the freeform path(s) past the encapsulated PCM and through the energy store.

Preferably the PCM is encapsulated in multiple elongate closed-ended pipes arranged in one or more spaced arrangements (such as staggered rows of pipes, each row comprising a plurality of spaced apart pipes) with the heat transfer fluid preferably arranged to flow laterally (or transverse to the length of the pipe or other encapsulating enclosure) over the pipes—either on route from the inlets to the outlets or, if an input coil is used, as directed by one or more impellers provided within the thermal energy store.

Optionally, the output circuit may be arranged to be at the top of the energy store and positioned over and above the encapsulated PCM—the containers of which may be disposed horizontally and either above an input loop or coil (so that convection supports energy transfer upwards through the energy store) or with inlets direction incoming heat transfer liquid against the encapsulated PCM and optionally towards the output circuit above. If one or more impellers is used, preferably the or each impeller is magnetically coupled to an externally mounted motor—so that the integrity of the enclosure of the energy store is not compromised.

Optionally the PCM may be encapsulated in elongate tubes, typically of circular cross section, with nominal external diameters in the range of 20 to 67 mm, for example 22 mm, 28 mm, 35 mm, 42 mm, 54 mm, or 67 mm, and typically these tubes will be formed of a copper suitable for plumbing use. Preferably, the pipes are between 22 mm and 54 mm, for example between 28 mm and 42 mm external diameter.

The heat transfer liquid is preferably water or a water-based liquid such as water mixed with one or more of a flow additive, a corrosion inhibitor, an anti-freeze, a biocide,—and may for example comprise an inhibitor of the type designed for use in central heating systems—such as Sentinel X100 or Fernox F1 (both RTM)—suitably diluted in water.

Thus, throughout the description and claims of the present application the expression input circuit should be construed, unless the context clearly requires otherwise, to include an arrangement as just described and in which the path of liquid flow from the input of the input circuit to its output is not defined by a regular conduit but rather involves the liquid flowing substantially freely within the enclosure of the energy store.

The PCM may be encapsulated in a plurality of elongate cylinders of circular or generally circular cross section, the cylinders preferably being arranged spaced apart in one or more rows. Preferably the cylinders in adjacent rows are offset with respect to each other to facilitate heat transfer from and to the heat transfer liquid. Optionally an input arrangement is provided in which heat transfer liquid is introduced to the space about the encapsulating bodies by one or more input ports which may be in the form of a plurality of input nozzles, that direct the input heat transfer liquid towards and onto the encapsulating bodies fed by an input manifold. The bores of the nozzles at their outputs may be generally circular in section or may be elongate to produce a jet or stream of liquid that more effectively transfers heat to the encapsulated PCM. The manifold may be fed from a single end or from opposed ends with a view to increasing the flow rate and reducing pressure loss.

The heat transfer liquid may be pumped into the energy store 12 as the result of action of a pump of the green energy source (e.g. a heat pump or solar hot water system), or of another system pump, or the thermal energy store may include its own pump. After emerging from the energy store at one or more outlets of the input circuit the heat transfer liquid may pass directly back to the energy source (e.g. the heat pump) or may be switchable, through the use of one or more valves, to pass first to a heating installation (e.g. underfloor heating, radiators, or some other form of space heating) before returning to the green energy source.

The encapsulating bodies may be disposed horizontally with the coil of the output circuit positioned above and over the encapsulating bodies. It will be appreciated that this is merely one of many possible arrangements and orientations. The same arrangement could equally well be positioned with the encapsulating bodies arranged vertically.

Alternatively an energy store using PCM encapsulation may again use cylindrical elongate encapsulation bodies such as those previously described, but in this case with an input circuit in the form of conduit for example in the form of a coil. The encapsulation bodies may be arranged with their long axes disposed vertically, and the input 14 and output 18 coils disposed to either side of the energy store 12. But again this arrangement could also be used in an alternative orientation, such as with the input circuit at the bottom and the output circuit at the top, and the encapsulation bodies with their long axes disposed horizontally. Preferably one or more impellers are arranged within the energy store 12 to propel energy transfer liquid from around the input coil 14 towards the encapsulation bodies. The or each impeller is preferably coupled via a magnetic drive system to an externally mounted drive unit (for example an electric motor) so that the enclosure of the energy store 12 does not need to be perforated to accept a drive shaft—thereby reducing the risk of leaks where such shafts enter the enclosure.

By virtue of the fact that the PCM is encapsulated it becomes readily possible to construct an energy store that uses more than one phase change material for energy storage, and in particular permits the creation of an energy storage unit in which PCMs with different transition (e.g. melting) temperatures can be combined thereby extending the operating temperature of the energy store.

It will be appreciated that in embodiments of the type just described the energy store 12 contains one or more phase change materials to store energy as latent heat in combination with a heat transfer liquid (such as water or a water/inhibitor solution).

A plurality of resilient bodies that are configured to reduce in volume in response to an increase in pressure caused by a phase change of the phase change material and to expand again in response to a reduction in pressure caused by a reverse phase change of the phase change material are preferably provided with the phase change material within the encapsulation bodies (they may also be used in energy banks using "bulk" PCMs as described elsewhere in this specification.

Metal foams, for example of aluminium, aluminium alloys or copper, may be used to improve the heat transfer properties of the thermal storage material—notably when paraffin wax is used as the thermal storage material. Alternatively, the heat transfer pipes of the input and output circuits of the heat exchanger may be provided with protrusions, blades, fingers, wires or filaments, formed of a material with a high thermal conductivity—such as copper, a copper alloy, or carbon fibre, which extend into the mass of thermal storage material (e.g. wax) to effectively improve energy transfer from the fluid in the input circuit into the thermal storage mass, throughout the thermal storage mass, and from the thermal storage mass into the water in the output circuit of the heat exchanger. It can be seen here that the input-side and output-side circuit within the enclosure of the heat exchanger are defined by tubular bodies, and filamentary protrusions may be provided extending into the phase change material from each of the tubular bodies, wherein the filamentary protrusions have higher conductivity than the phase change material.

For example, copper wires, copper blades, or fingers can be directly attached, e.g. by welding, to the copper pipes (a preferred choice of material for the circuits of the heat exchanger giving the preponderance of copper usage in domestic heating and water systems: for installations that use aluminium alloy pipework and radiant bodies, it may be preferred, for electrochemical reasons, to also make the heat exchanger input and output circuits and protrusions from aluminium or an alloy thereof) that provide the input and output circuits, a free end of each protrusion extending away from the pipe to which it is attached. Alternatively, each heat transfer blade, or possibly multiple heat transfer wires or fingers could be attached to a sprung clip (e.g., of phosphor bronze) which is clipped over and thereby secured to a pipe of one or other of the input and output circuits of the heat exchanger.

As previously described, with reference to FIG. 3, the state of the phase change material, may be determined based on its internal pressure. A pressure transducer may be coupled to the processor of the interface unit. The processor of the interface unit therefore receives the signal relating to the degree of solidification/liquification of the phase change material—which provides information on an energy storage amount of the phase change material. The processor of the interface unit can be programmed during manufacture, or subsequently, based on empirical analysis of prototypes, so that the degree of solidification (more generally, the state) of the phase change material can be mapped to pressure signals from the pressure transducer. For example, preproduction prototypes may be fitted with a glass side panel so that the state of the phase change material can be determined by inspection/analysis, and the state mapped against pressure signals from the pressure transducer, knowledge of the latent heat of fusion of the phase change material being used will enable the amount of latent heat stored in the heat exchanger to be calculated for every pressure measured. Data obtained in this way can then be used in programming the processors for production interface unit, and in informing machine learning algorithms in this and potentially other processors in the system.

As also previously described, another method of monitoring the state of the phase change material which could be provided as an alternative to previously described methods, or in addition to one or more of these, would be to provide one or more optical sources to emit optical radiation into the body of phase change material for detection by one or more appropriately located optical sensors (an optical sensing arrangement). The one or more optical sources may operate on a single wavelength, or range of wavelengths (i.e., in effect a single colour), or could operate at two or more spaced apart wavelengths (i.e., different colours). The radiation may be in the visible or infrared regions of the spectrum, or both in the event that multiple colours of light are used. The optical source may be a source of incoherent light, such as an LED, or could be a laser, e.g., an LED laser. The optical source may be a single red-green-blue light emitting diode. The optical sensing arrangement may be coupled to a processor (e.g., the processor of the interface unit) which is configured to estimate an amount of energy stored in the phase change material based on information received from the optical sensing arrangement.

As also previously described, another method of monitoring the state of the phase change material which could be provided as an alternative to previously described methods, or in addition to one or more of these, would be to provide an acoustic source configured to launch sound into the phase change material within the heat exchanger, and an acoustic sensing arrangement to detect sound launched from the acoustic source after the sound has passed through the phase change material. Preferably, the acoustic source is configured to produce ultrasound.

As will be appreciated, the disclosure provides an installation comprising an in-building hot water system including an interface unit or energy bank as described in any alternative above, the input-side circuit of the heat exchanger being coupled to a heat pump, and the output-side circuit of the heat exchanger being coupled to the in-building hot water system.

The disclosure also provides an installation comprising an in-building hot water system including an interface unit as described in any alternative above, the input-side circuit of the heat exchanger being coupled to a heat pump, the output-side circuit of the heat exchanger being coupled to the in-building hot water system having a flow sensor and a temperature sensor, an electrical heater configured to heat water for the hot water system downstream of the output-side circuit of the heat exchanger, and a processor operatively coupled to the heat pump, the flow sensor, the temperature sensor and the electrical heater, wherein the processor is provided with logic to manage the use of the electric heater, the heat pump, and energy from the phase change material to reduce energy consumption.

The disclosure further provides an installation comprising an in-building hot water system including an interface unit as described in any alternative above, the input-side circuit of the heat exchanger being coupled to a heat pump, the output-side circuit of the heat exchanger being coupled to the in-building hot water system having a flow sensor and a temperature sensor, an electrical heater configured to heat water for the hot water system downstream of the output-side circuit of the heat exchanger, and a processor operatively coupled to the heat pump, the flow sensor, the temperature sensor and the electrical heater, wherein the processor is provided with logic to manage the installation to provide a flow of hot water requiring a greater power input than the power of the heat pump.

Any of these installations further may further comprise one or more additional heat exchangers, the or each additional heat exchanger comprising an enclosure, and within the enclosure: an input-side circuit coupled to the heat pump; an output-side circuit coupled to the in-building hot water system; and a phase-change material for the storage of energy. Optionally, the installation may further comprise a pressure sensor in a cold-water supply to the in-building hot water system, and a processor coupled to the pressure sensor, the processor being configured to generate a warning in the event that a loss of pressure is detected. Optionally, the processor is configured only to generate a warning in the event that the loss of pressure continues for more than a threshold time. Optionally, the installation further comprising a flow sensor in a cold-water supply to the in-building hot water system, the flow sensor being coupled to the processor. Optionally, the processor is configured to use information from both the pressure sensor and the flow sensor in generating the warning.

The disclosure also provides a method of replacing a gas-fired combination boiler which is plumbed into an in-building hot water system, the method comprising: removing the gas-fired combination boiler to create an installation space; installing an interface unit as described in any alternative above in the installation space; coupling the output-side circuit of the heat exchanger to the in building hot water; and coupling the input-side circuit of the heat exchanger to the heat pump, so that water for the in-building hot water system can be heated by the heat phase change material and/or the heat pump. Preferably, this method further comprising coupling the input-side circuit of the heat exchanger to an in-building space heating system. Preferably, the method further comprises operatively connecting a processor of the interface unit to a controller of the heat pump, to enable the processor to control aspects of the behaviour of the heat pump.

Optionally, during the commissioning process the engineer will be asked to define all hot water outlets (for e.g.: tap, shower, bath, kitchen). The processor of the system may ask the engineer to fully open and close tap at a specific moment (via a WTRU, possibly on which a suitable app is provided). During this process the system will measure water flow and will add results a database. Based on this information, the system will be able to provide the most efficient flow into each single tap when a single tap is open.

Thus, the disclosure also provides a method of mapping a hot-water supply installation having a plurality of controllable hot-water outlets, the installation including:

a supply of hot-water; in a hot-water flow path between the supply of hot water and the plurality of controllable hot-water outlets, a flow measurement device and at least one flow regulator;

a processor operatively connected to the flow measurement device and the at least one flow regulator; the method comprising: opening a first of the plurality of controllable hot-water outlets and processing signals from the flow measurement device with the processor at least until a first flow characteristic is determined; closing the first of the plurality of controllable hot-water outlets;

opening a second of the plurality of controllable hot-water outlets and processing signals from the flow measurement device with the processor at least until a second flow characteristic is determined;

closing the second of the plurality of controllable hot-water outlets; repeating the opening, processing and closing operations for each of the other controllable hot-water outlets of the plurality to determine for each controllable hot-water outlets a respective flow characteristic; subsequently configuring the processor to: identify the opening of a particular one of the plurality of controllable hot-water outlets based on the similarity of a detected flow characteristic to a respective flow characteristic; and control said at least one flow regulator, based on the identification, to control a supply of hot-water to the identified controllable hot-water outlet.

Optionally, in this method the processor may be coupled to a radio frequency transmitter, the method further comprising the processor sending a series of signals to the radio frequency transmitter, each of the signals causing the radio frequency transmitter to transmit a signal instructing the opening of a different one of the plurality of controllable hot-water outlets.

Optionally, the processor may be coupled to a radio frequency receiver, the method further comprising receiving at the processor a series of signal from the radio frequency receiver, each of the received signals coinciding with the opening of a different one of the plurality of controllable hot-water outlets. Optionally, each received signal includes a time stamp related to the opening of the relevant one of the plurality of controllable hot-water outlets.

Optionally, in any of these methods of mapping, each of the respective flow characteristic includes a respective stable flow rate. Optionally, the processor may be configured to control the at least one flow regulator to impose at least a 10% cut in the flow rate to each of each of the plurality of controllable hot-water outlets, based on the respective stable flow rate. As an optional alternative, the processor may be configured to control the at least one flow regulator to impose at least a 10% cut in the flow rate, based on respective stable flow rate, to any of the plurality of controllable hot-water outlets whose respective stable flow rate is greater than 7 litres per minute. As an optional alternative, the processor may be configured to control the at least one flow regulator to cap the flow rate to each of the plurality of controllable hot-water outlets at no more than 7 litres per minute.

The present disclosure also provides a hot-water supply installation having including:

a source of hot-water; a plurality of controllable hot-water outlets coupled to the source of hot water;

in a hot-water flow path between the source of hot water and the plurality of controllable hot-water outlets, a flow measurement device and at least one flow regulator; a processor operatively connected to the flow measurement device and the at least one flow regulator; and a memory, operatively coupled to the processor, the memory storing instructions that cause the processor to perform a method of mapping the hot-water supply installation in which method the processor: processes signals received from the flow measurement device consequent on the opening of a first of the plurality of controllable hot-water outlets at least until a first flow characteristic is determined; after the closing of the first of the plurality of controllable hot-water outlets, processes signals received from the flow measurement device consequent on the opening of a second of the plurality of controllable hot-water outlets at least until a second flow characteristic is determined; after the closing of the second of the plurality of controllable hot-water outlets; repeating the operations for each of the other controllable hot-water outlets of the plurality to determine for each controllable hot-water outlets a respective flow characteristic; thereafter, the processor being configured to: identify the opening of a particular one of the plurality of controllable hot-water outlets based on the similarity of a detected flow characteristic to a respective flow characteristic; and control said at least one flow regulator, based on the identification, to control a supply of hot-water from the source of hot-water to the identified controllable hot-water outlet.

Optionally, during the commissioning process the engineer may be asked to setup a temperature sensor direct under a particular water tap and open it at a specific moment. The system processor is configured to measure flow, the difference between both outflow and provided temperature, time delay and, preferably, outdoor temperature (data provided from an external Temp sensor). This will allow algorithms (e.g., MLAs) to calculate heat loss through the distribution system, distance between tap and the heat source unit, and finally, accurately compensate outflow temperature to achieve the correct tap temperature.

Figure 10:
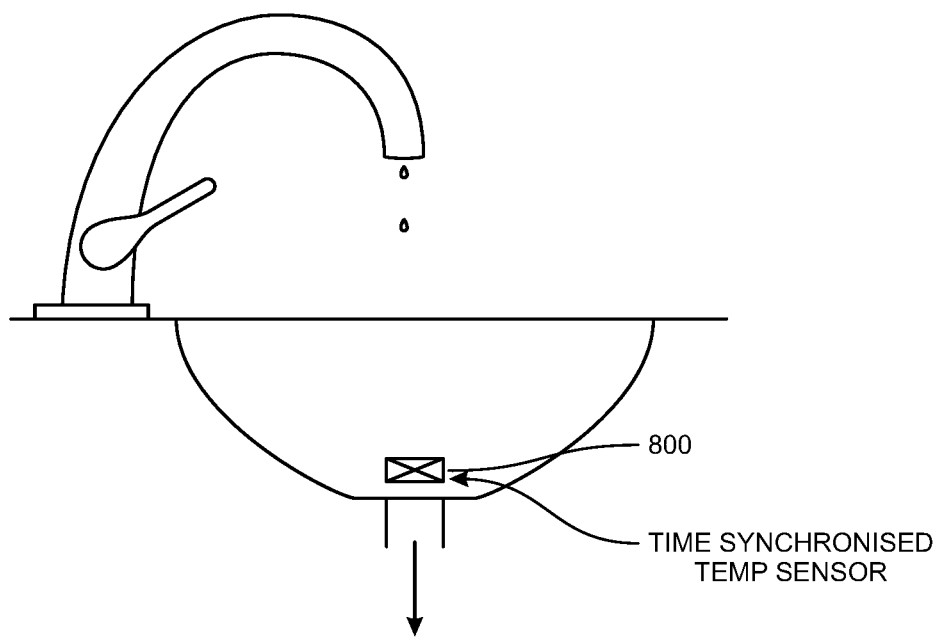
FIG. 10 illustrates schematically a method of configuring a hot-water supply installation having a plurality of controllable hot-water outlets.
Figure 10:
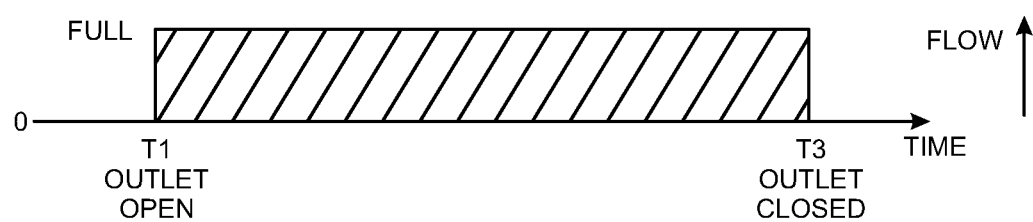
Figure 10:
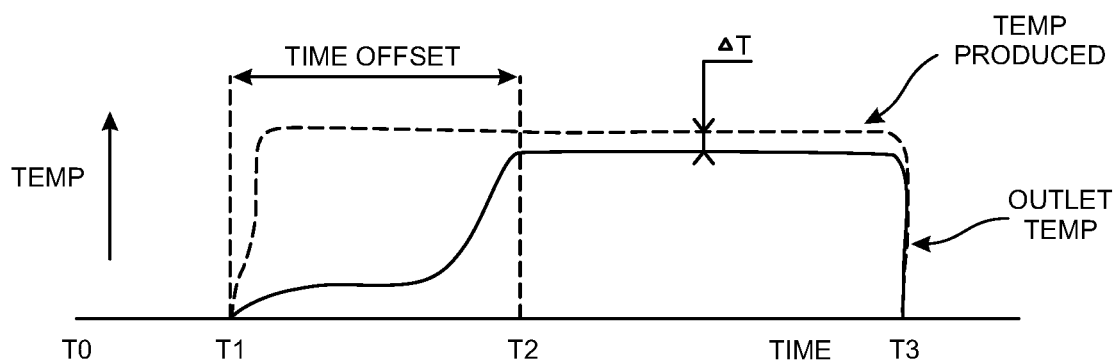

FIG. 10 illustrates schematically such a method of configuring a hot-water supply installation having a plurality of controllable hot-water outlets—for example a plurality of taps, and a shower outlet. In order to improve the efficiency of energy usage an installation, such as one including an interface as previously described, a processor of the system (preferably of the interface unit, but additionally or alternatively of an overarching system) or is used in conjunction with a temperature sensor 800 (although clearly more than one sensor may be used, rather than the same one being used for every outlet) that is placed beneath each of the outlets in turn. An installer may have an app on a smart phone, for example, or some other wireless transmission reception unit (WTRU) that is able to receive an instruction from the processor that tells the installer to open the relevant tap (preferably to open it to its maximum opening as quickly as possible. Thus, as shown in the flow against time plot in FIG. 10, there is an initial lag (time T0 to T1), due to the reaction time of the installer, before flow through the outlet and through the hot water system (as only one outlet at a time is opened) goes from zero to a maximum at T1 (the maximum possibly being different and unique to each outlet of the hot water system). Or the installer may use the (app on) WTRU to inform the processor that an agreed/identified tap is being opened now. In either event, the processor also receives information from a temperature sensor on an outlet of a source of hot water with an outlet having a controllable outflow temperature. The temperature sensor 800 also preferably includes an internal clock (preferably synchronised to the system time of the processor) and an RF (e.g., Wi-Fi, Bluetooth, or IMS) capability for communicating time and temperature information to the remote processor. The temperature against time plot of FIG. 10 shows how the temperature sensed by sensor 800 initially remains low and then climbs to reach a stable maximum at time T2 some time after time T1. It can also be seen that the maximum detected temperature sensed by sensor 800 (from time T1 to T3) is lower, by ΔT, than the temperature at the outlet of the source of hot water having a controllable outflow temperature.

It will be appreciated that the temperature sensor 800 may be configured in such a way that the data that it gathers (time vs temperature) is only provided to the processor the interface unit (or of the system) after the event—i.e., by a wired download process or using NFC, but this will generally be less satisfactory than providing direct RF communication as already described.

Thus, the present disclosure also provides a method of configuring a hot-water supply installation having a plurality of controllable hot-water outlets, the installation including:
 a source of hot water with an outlet having a controllable outflow temperature;
 in a hot-water flow path between the outlet of the source of hot water and the plurality of controllable hot-water outlets, a flow measurement device and at least one flow regulator; a first temperature sensor to detect the outflow temperature; a processor operatively connected to the flow measurement device, the first temperature sensor, and the at least one flow regulator; the method comprising:
 placing an outlet temperature sensor in an outflow path for a first of the controllable hot water outlets;
 opening the first of the controllable hot-water outlets, so that water from the first of the controllable hot-water outlets falls on the outlet temperature sensor; generating data by monitoring, using the outlet temperature sensor, a variation with respect to time, of the temperature of water from the first of the controllable hot-water outlets; supplying the data to the processor; processing, using the processor, timing information about the time of the opening of the first of the controllable hot-water outlets, the data, and information from the first temperature sensor, to determine first parameters to control the outflow temperature of the source of hot-water, and optionally to control the at least one flow regulator, for use when the processor subsequently detects operation of the first of the controllable hot-water outlets.

Optionally this method further comprises generating corresponding data for a second of the plurality of controllable hot-water outlets by placing an outlet temperature sensor in an outflow path for the second of the controllable hot-water outlets; opening the second of the controllable hot-water outlets so that water from the second of the controllable hot-water outlets falls on the outlet temperature sensor; generating second data by monitoring, using the outlet temperature sensor, a variation with respect to time, of the temperature of water from the first of the controllable hot-water outlets; supplying the second data to the processor; processing, using the processor, timing information about the time of the opening of the second of the controllable hot-water outlets, the second data, and information from the first temperature sensor, to determine second parameters to control the outflow temperature of the source of hot-water for use when the processor subsequently detects operation of the second of the controllable hot-water outlets.

Optionally either of these methods of configuring further comprises the processor causing a message to be sent indicating that the first or the second of the controllable hot-water outlets is to be opened.

Optionally either of these methods of configuring further comprises receiving at the processor a message indicating which of the first or the second of the controllable hot-water outlets is about to be opened.

Optionally with any of these methods of configuring, the installation includes a radio frequency transmitter operatively connected to the processor. Optionally, in this method the processor signals to the radio frequency transmitter to cause the radio frequency transmitter of the installation to transmit a signal indicating that the relevant controllable hot-water outlet is to be closed.

The radio frequency transmitter may be located remotely, and the signalling of the processor to the radio frequency transmitter is through a data connection.

Optionally, the installation includes a radio frequency receiver operatively connected to the processor. The temperature sensor used to monitor the variation with respect to time of the temperature of water from the controllable hot-water outlet may include a sensor RF transmitter, the method further comprising using the sensor RF transmitter to transmit the data to the radio frequency receiver.

In any of these methods of configuring, the processor may be operatively connected to a source of information on an external ambient temperature, the method further comprising the processor using information on the ambient air temperature in determining the parameters.

The present disclosure also provides a method of controlling the temperature of water delivered from a controllable water outlet of a hot-water supply installation, the controllable water outlet being one of a plurality of controllable hot-water outlets, the installation including:
 a source of hot-water with an outlet having a controllable outflow temperature; in a hot-water flow path between the outlet of the source of hot water and the plurality of controllable hot-water outlets, a flow measurement device and at least one flow regulator; a first temperature sensor to detect the outflow temperature; a memory storing parameters generated using any one of the foregoing methods of configuring;
 a processor operatively connected to the memory, the flow measurement device, the first temperature sensor, and the at least one flow regulator; the method comprising, in the event that one of the plurality of controllable hot-water outlets is opened, using the processor: determining, using the processor, which of the plurality of controllable hot-water outlets has been opened; and based on that determination controlling the outflow temperature of the source of hot-water, and optionally controlling the at least one flow regulator, in accordance with stored parameters for the determined one of the controllable hot-water outlets.

The present disclosure also provides a hot-water supply installation having a plurality of controllable hot-water outlets, the installation including: a source of hot-water with an outlet having a controllable outflow temperature; in a hot-water flow path between the outlet of the source of hot water and the plurality of controllable hot-water outlets, a flow measurement device and at least one flow regulator; a first temperature sensor to detect the outflow temperature; a memory storing parameters generated using any one of the foregoing methods of configuring; a processor operatively connected to the memory, the flow measurement device, the first temperature sensor, and the at least one flow regulator; the processor being configured, in the event that one of the plurality of controllable hot-water outlets is opened, to determine which of the plurality of controllable hot-water outlets has been opened, and then based on that determination to control the outflow temperature of the source of hot-water, and optionally to control the at least one flow regulator, in accordance with stored parameters for the determined one of the controllable hot-water outlets.

The present application contains a number of self-evidently inter-related aspects and embodiments, generally based around a common set of problems, even if many aspects do have broader applicability. In particular the logic and control methods, whilst not necessarily limited to operating with the hardware disclosed and may be more broadly applied, are all particularly suited to working with the hardware of the various hardware aspects and the preferred variants thereof. It will be appreciated by the skilled person that certain aspects relate to specific instances of other features and the preferred features described or claimed in particular aspects may be applied to others. The disclosure would become unmanageably long if explicit mention were made at every point of the inter-operability and the skilled person is expected to appreciate, and is hereby explicitly instructed to appreciate, that preferred features of any aspect may be applied to any other unless otherwise explicitly stated otherwise or manifestly inappropriate from the context. Again, for the sake of avoiding repetition, many aspects and concepts may be described only in method form or in hardware form but the corresponding apparatus or computer program or logic is also to be taken as disclosed in the case of a method or the method of operating the hardware in the case of an apparatus discussion. For an example of what is meant by the above, there are a number of features of both hardware and software relating to the combination of a fluid based (typically air source) heat pump and a phase change material and an electric supplementary heating element and control by a processor (within the unit or remote or both). Although this is the preferred application, most methods and hardware are more generally applicable to other heat pumps (thermoelectric and ground source) and to other renewable energy sources (a pump for a solar array for example) and to alternative supplementary heating (including the less preferred arrangement of a combustion heater such as a gas boiler, or even a less efficient higher temperature lower COP heat pump) and alternative thermal storage, including multi-temperature thermal storage arrays. Moreover, aspects which give particular arrangements for any of the components, or their interaction can be used freely with aspects which focus on alternative elements of the system.

The invention claimed is:

1. A method of signalling a command to a water heating appliance from a controllable water outlet supplied with water from the water heating appliance via a water supply line, the water heating appliance incorporating a renewable energy source in a form of a heat pump or a solar heating arrangement, and an energy store containing an energy storage medium to store thermal energy, and an instantaneous water heater, the method comprising:
 monitoring the water supply line that feeds the controllable water outlet;
 detecting a sequence of at least three changes within an interval of less than five seconds in a property or state of the water supply consequent on operation of the controllable water outlet;
 correlating the sequence of changes with a stored pattern of changes;
 determining whether the sequence of at least three changes and the stored pattern of changes match within a stored threshold;

interpreting the match as the command;
wherein the water heating appliance is arranged initially to provide heated water in a first mode when the controllable water outlet is opened and is arranged to switch to a second mode when the command is received;
wherein the first mode comprises an economy mode using one or both of the renewable energy source and stored thermal energy from the energy store wherein the renewable energy source is used depending on the amount of thermal energy stored in the energy storage medium, and
wherein the second mode comprises using the instantaneous water heater as required to achieve a predetermined target flow and temperature; and
wherein the purpose of the command is to change a flow rate or the temperature of the water supplied by the controllable water outlet.

2. The method of claim 1, wherein the property is pressure sensed at a location within the water supply line.

3. The method of claim 2, wherein the sequence of at least three changes comprises a series of fluctuations in pressure between high and low pressures, the low pressure being a lower pressure than the high pressure.

4. The method of claim 3, wherein the series of fluctuations in pressure include at least two high-pressure pulses following a period of low pressure.

5. The method of claim 2, wherein the sequence of at least three changes comprises a low pressure pulse, a high pressure pulse and then a relatively low pressure pulse, the low pressure being a lower pressure than the high pressure.

6. The method of claim 2, wherein the sequence of at least three changes comprises a high pressure pulse, a low pressure pulse and then a high pressure pulse, the low pressure being a lower pressure than the high pressure.

7. The method of claim 1, wherein the property is rate of flow of water in the water supply that feeds the controllable water outlet.

8. The method of claim 7, wherein the sequence of at least three changes comprises a series of fluctuations in flow rate between high and low flow rates, the low flow rate being lower than the high flow rate.

9. The method of claim 8, wherein the series of fluctuations in flow rate include at least two high flow periods following a period of low flow.

10. The method of claim 8, wherein the sequence of at least three changes comprises a high flow period, a low flow period and then a high flow period.

11. The method of claim 1, wherein the water heating appliance is arranged to revert to the first mode from the second mode after the outlet is closed again, so that when the outlet is subsequently opened the water heating appliance once again provides heated water in the first mode.

12. The method of claim 11, wherein the water heating appliance is arranged to revert to the first mode from the second mode only after the outlet has been closed for more than a predetermined period.

13. The method of claim 1, including learning the pattern for the command using a machine learning module with user feedback to set thresholds and distinguish false positives.

14. A water heating appliance arranged to supply water to a controllable water outlet remote from the water heating appliance, the water heating appliance incorporating a renewable energy source in a form of a heat pump or a solar heating arrangement, and an energy store containing an energy storage medium to store thermal energy, and an instantaneous water heater, the renewable energy source being arranged to supply energy to the energy storage arrangement, the water heating appliance comprising:
a water supply line arranged to feed the controllable water outlet with heated water from the water heating appliance;
at least one sensor to sense a property or state of the water supply line; and
a processor coupled to the at least one sensor,
the processor being configured to:
process data received from the at least one sensor to monitor a property or state of the water supply line that feeds the controllable water outlet;
detect a sequence of at least three changes within an interval of less than five seconds in a property or state of the water supply consequent on operation of the controllable water outlet;
correlate the sequence of changes with a stored pattern of changes;
determine that the sequence of at least three changes and the stored pattern of changes match within a stored threshold; and
interpret the match as a command;
wherein the water heating appliance is arranged initially to provide heated water in a first mode when the controllable water outlet is opened and is arranged to switch to a second mode when the command is received;
wherein the first mode comprises an economy mode using one or both of the renewable energy source and stored thermal energy from the energy store wherein the renewable energy source is used depending on the amount of thermal energy stored in the energy storage medium, and
wherein the second mode comprises using the instantaneous water heater to achieve a predetermined target flow and temperature; and
wherein the purpose of the command is to change a flow rate or the temperature of the water supplied by the controllable water outlet.

15. The water heating appliance of claim 14, wherein the at least one sensor includes a pressure sensor to sense pressure in the water supply line.

16. The water heating appliance of claim 14, wherein the at least one sensor includes a flow sensor to measure flow in the water supply line.

17. The water heating appliance of claim 13, wherein the heating appliance includes a valve to mix heated water with a supply of cold water, the valve being controlled by the processor.

* * * * *

UNITED STATES PATENT AND TRADEMARK OFFICE
CERTIFICATE OF CORRECTION

Page 1 of 1

PATENT NO. : 12,281,817 B2
APPLICATION NO. : 18/275842
DATED : April 22, 2025
INVENTOR(S) : Peter Konowalczyk It is certified that error appears in the above-identified patent and that said Letters Patent is hereby corrected as shown below:

In the Claims

In Claim 5, Column 37, Line 30 after "pulse and then a" please DELETE ""relatively""

In Claim 17, Column 38, Line 56 please CHANGE "claim 13" to --"claim 14"--

Signed and Sealed this
Sixteenth Day of September, 2025

Coke Morgan Stewart
*Acting Director of the United States Patent and Trademark Office*